US012793301B2

(12) United States Patent
Lu et al.

(10) Patent No.: US 12,793,301 B2
(45) Date of Patent: Nov. 10, 2026

(54) METHODS AND SYSTEMS FOR MOTION CORRECTION OF POSITRON EMISSION COMPUTED TOMOGRAPHY (PET) IMAGES

(71) Applicant: SHANGHAI UNITED IMAGING HEALTHCARE CO., LTD., Shanghai (CN)

(72) Inventors: Yihuan Lu, Shanghai (CN); Qing Ye, Shanghai (CN); Chen Sun, Shanghai (CN); Hao Liu, Shanghai (CN); Yun Dong, Shanghai (CN); Tao Feng, Houston, TX (US)

(73) Assignee: SHANGHAI UNITED IMAGING HEALTHCARE CO., LTD., Shanghai (CN)

(*) Notice: Subject to any disclaimer, the term of this patent is extended or adjusted under 35 U.S.C. 154(b) by 234 days.

(21) Appl. No.: 18/437,170

(22) Filed: Feb. 8, 2024

(65) Prior Publication Data

US 2024/0242399 A1 Jul. 18, 2024

Related U.S. Application Data

(63) Continuation of application No. PCT/CN2023/070642, filed on Jan. 5, 2023.

(30) Foreign Application Priority Data

Jan. 5, 2022 (CN) ......................... 202210008392.0
Sep. 1, 2022 (CN) ......................... 202211067037.7

(51) Int. Cl.
*G06T 7/20* (2017.01)
*G06T 7/00* (2017.01)
(Continued)

(52) U.S. Cl.
CPC ............ *G06T 12/10* (2026.01); *G06T 7/0012* (2013.01); *G06T 7/20* (2013.01); *G06T 12/20* (2026.01);
(Continued)

(58) Field of Classification Search
CPC ................ G06T 11/005; G06T 11/006; G06T 2207/10104; G06T 2207/20081;
(Continued)

(56) References Cited

U.S. PATENT DOCUMENTS 10,403,007 B2 9/2019 Gholipour-Baboli et al.
11,069,096 B2 7/2021 Fournie
(Continued)

FOREIGN PATENT DOCUMENTS

CN 108416743 A 8/2018
CN 108932741 A 12/2018
(Continued)

OTHER PUBLICATIONS

Sang-Keun Woo et al. "Development of event-based motion correction technique for PET study using list-mode acquisition and optical motion tracking system," Proc. SPIE 5032, Medical Imaging 2003; https://doi.org/10.1117/12.481356 (Year: 2003).*
(Continued)

*Primary Examiner* — Amandeep Saini
*Assistant Examiner* — Jaspreet Kaur
(74) *Attorney, Agent, or Firm* — METIS IP LLC

(57) ABSTRACT

The present disclosure provides systems and methods for motion correction of a positron emission computed tomography (PET) image. The method may include: obtaining scanned images of a scanned object generated at a plurality of time points; and determining a parametric image by performing a correction processing on the scanned images, wherein the correction processing may be configured to
(Continued)

200 correct an influence of a motion of the scanned object on the scanned images.

17 Claims, 16 Drawing Sheets

(51) Int. Cl.
*G06T 12/10* (2026.01)
*G06T 12/20* (2026.01)

(52) U.S. Cl.
CPC ............... *G06T 2207/10104* (2013.01); *G06T 2207/20081* (2013.01); *G06T 2207/30168* (2013.01)

(58) Field of Classification Search
CPC ..... G06T 2207/30168; G06T 2211/441; G06T 7/0012; G06T 7/20; G06T 2207/30004; G06N 3/0442; G06N 3/045; G06N 3/084; A61B 6/5264
See application file for complete search history.

(56) References Cited

U.S. PATENT DOCUMENTS

| | | | | |
|---|---|---|---|---|
| 2011/0293143 | A1 | 12/2011 | Narayanan et al. | |
| 2012/0089015 | A1 | 4/2012 | Gagnon et al. | |
| 2013/0287278 | A1 | 10/2013 | Olivier et al. | |
| 2016/0095565 | A1 | 4/2016 | Fenchel | |
| 2017/0042496 | A1* | 2/2017 | Shanbhag | A61B 6/5264 |
| 2019/0108441 | A1 | 4/2019 | Thibault et al. | |
| 2019/0287275 | A1 | 9/2019 | Zhu et al. | |
| 2020/0320753 | A1 | 10/2020 | Feng | |
| 2021/0196219 | A1 | 7/2021 | Jansen et al. | |
| 2021/0350591 | A1* | 11/2021 | Hu | A61B 6/037 |

FOREIGN PATENT DOCUMENTS

| | | | | |
|---|---|---|---|---|
| CN | 109754448 | A | 5/2019 | |
| CN | 111544023 | A | 8/2020 | |
| CN | 113194834 | A * | 7/2021 | G01N 23/044 |
| CN | 113822298 | A | 12/2021 | |
| CN | 114373029 | A | 4/2022 | |

OTHER PUBLICATIONS

Herraiz JL, Sitek A. Sensitivity estimation in time-of-flight list-mode positron emission tomography. Med Phys. Nov. 2015;42(11):6690-702. doi: 10.1118/1.4934374 (Year: 2015).*

The Second Office Action in Chinese Application No. 202210008392.0 mailed on Jul. 1, 2025, 18 pages.

International Search Report in PCT/CN2023/070642 mailed on Mar. 22, 2023, 4 pages.

Written Opinion in PCT/CN2023/070642 mailed on Mar. 22, 2023, 5 pages.

Zhu, Wentao et al., Efficient High Resolution Regional Reconstruction Algorithm for PET Imaging, China Medical Equipment, 12(10): 18-22, 2015.

* cited by examiner

500

1300

METHODS AND SYSTEMS FOR MOTION CORRECTION OF POSITRON EMISSION COMPUTED TOMOGRAPHY (PET) IMAGES

CROSS-REFERENCE TO RELATED APPLICATIONS

This application is a continuation of International Patent Application No. PCT/CN2023/070642, filed on Jan. 5, 2023, which claims priority of the Chinese Patent Application No. 202210008392.0, filed on Jan. 5, 2022, and the Chinese Patent Application No. 202211067037.7, filed on Sep. 1, 2022, the contents of each of which are entirely incorporated herein by reference.

TECHNICAL FIELD

The present disclosure relates to the technical field of data processing, and in particular to methods and systems for motion correction of PET images.

BACKGROUND

A PET imaging device takes a long time to scan, and a scanned object is prone to move during the scanning process. Motion deformation affects not only image quality but also accuracy of pharmacokinetic analysis. Therefore, it is necessary to provide methods and systems for motion correction of PET images to ensure that the motion of the scanned object during the scanning process may not affect the image quality and the accuracy of pharmacokinetic analysis.

SUMMARY

In one aspect of the present disclosure, a method for motion correction of a positron emission computed tomography (PET) scanned image is provided. The method may include: obtaining scanned images of a scanned object generated at a plurality of time points; and determining a parametric image by performing a correction processing on the scanned images, wherein the correction processing is configured to correct an influence of a motion of the scanned object on the scanned images.

In some embodiments, the determining a parametric image by performing a correction processing on the scanned images may include: determining an initial time-activity curve of at least one voxel of the scanned images based on the scanned images; determining a corrected time-activity curve based on the scanned images or the initial time-activity curve; and determining the parametric image based on the corrected time-activity curve.

In some embodiments, the determining a corrected time-activity curve based on the scanned images or the initial time-activity curve may include: determining a target region based on a target voxel of the scanned images; and determining, based on the scanned images or the initial time-activity curve of the at least one voxel in the target region, the corrected time-activity curve of the target voxel using a machine learning model.

In some embodiments, the determining a parametric image by performing a correction processing on the scanned images may include: determining an initial time-activity curve of at least one voxel of the scanned images based on the scanned images; and determining the parametric image by inputting an input function and the initial time-activity curve into a machine learning model.

In some embodiments, the determining the parametric image by inputting an input function and the initial time-activity curve into a machine learning model may include: determining kinetic parameters by inputting the input function and the initial time-activity curve into the machine learning model; and determining the parametric image based on the kinetic parameters.

In some embodiments, the determining the parametric image by inputting an input function and the initial time-activity curve into a machine learning model may include: determining a target region based on a target voxel of the scanned images; and determining, based on the input function and the initial time-activity curve of the at least one voxel in the target region, kinetic parameters and/or the parametric image of the target voxel using the machine learning model.

In some embodiments, the target region may include the target voxel at a central position of the target region and adjacent voxels of the target voxel.

In some embodiments, a training process for the machine learning model may include: obtaining a corrected time-activity curve or the kinetic parameters based on a motion-corrected parametric image; and training the machine learning model using a plurality of training samples, wherein the corrected time-activity curve, the kinetic parameters, or the motion-corrected parametric image may be used as a label of the plurality of training samples.

In some embodiments, the method may further include: obtaining motion information of the scanned object at the plurality of time points; and determining a quality evaluation result by performing a quality evaluation on the motion information.

In some embodiments, the determining a quality evaluation result by performing a quality evaluation on the motion information may include: determining position information to be evaluated at each time point of the plurality of time points by processing, based on the motion information, a line of response of the scanned object; and determining the quality evaluation result based on the position information to be evaluated at the each time point.

In some embodiments, the determining position information to be evaluated at each time point of the plurality of time points may include: relocating the line of response based on the motion information at the each time point to obtain a relocated line of response; and generating the position information to be evaluated according to the relocated line of response.

In some embodiments, the generating the position information to be evaluated according to the relocated line of response may include: determining back-projection data by performing, according to the relocated line of response, a back-projection on the target region in one of the scanned images at the each time point; determining corrected data by performing a sensitivity correction on the back-projection data; and determining the position information to be evaluated according to the corrected data.

In some embodiments, the position information to be evaluated may include a first index relating to a density distribution of the corrected data.

In some embodiments, the density distribution of the corrected data may be related to a barycentric coordinate of the target region at the each time point.

In some embodiments, the position information to be evaluated may include a second index, the second index being an angle change of the target region at the each time point relative to an initial position, the initial position being determined based on a reference frame of the scanned images.

In some embodiments, the determining the quality evaluation result based on the position information to be evaluated at the each time point may include: determining an evaluation index at the each time point based on the position information to be evaluated at the each time point; and determining one or more abnormal features based on a difference between the evaluation indexes at adjacent time points, wherein the one or more abnormal features may reflect the quality evaluation result.

In another aspect of the present disclosure, a system for motion correction of a positron emission computed tomography (PET) scanned image is provided. The system may include at least one storage device storing a set of instructions; and at least one processor in communication with the storage device, wherein when executing the set of instructions, the at least one processor may be configured to cause the system to perform operations including: obtaining scanned images of a scanned object generated at a plurality of time points; and determining a parametric image by performing a correction processing on the scanned images, wherein the correction processing may be configured to correct an influence of a motion of the scanned object on the scanned images.

In another aspect of the present disclosure, a non-transitory computer readable medium is provided. The non-transitory computer readable medium may store instructions, the instructions, when executed by at least one processor, may cause the at least one processor to implement a method comprising: obtaining scanned images of a scanned object generated at a plurality of time points; and determining a parametric image by performing a correction processing on the scanned images, wherein the correction processing may be configured to correct an influence of a motion of the scanned object on the scanned images.

In another aspect of the present disclosure, a method for motion correction of a positron emission computed tomography (PET) image is provided. The method may include: determining an initial time-activity curve of at least one voxel of scanned images based on the scanned images; and at least one of: determining a corrected time-activity curve based on the scanned images or the initial time-activity curve, and determining a parametric image based on the corrected time-activity curve; or determining the parametric image by inputting an input function and the initial time-activity curve into a machine learning model.

In another aspect of the present disclosure, a system for motion correction of a positron emission computed tomography (PET) image is provided. the system may include: a first determination module configured to determine an initial time-activity curve of at least one voxel of scanned images based on the scanned images; and at least one of: a correction module configured to determine a corrected time-activity curve based on the scanned images or the initial time-activity curve, and a first image determination module configured to determine a parametric image based on the corrected time-activity curve; or a second image determination module configured to determine the parametric image by inputting an input function and the initial time-activity curve into a machine learning model.

In another aspect of the present disclosure, a system for motion correction of a positron emission computed tomography (PET) scanned image is provided. The system may include: at least one storage device storing a set of instructions; and at least one processor in communication with the storage device, wherein when executing the set of instructions, the at least one processor is configured to cause the system to perform operations including: determining an initial time-activity curve of at least one voxel of scanned images based on the scanned images; and at least one of: determining a corrected time-activity curve based on the scanned images or the initial time-activity curve, and determining a parametric image based on the corrected time-activity curve; or determining the parametric image by inputting an input function and the initial time-activity curve into a machine learning model.

In another aspect of the present disclosure, a non-transitory computer readable medium is provided. The non-transitory computer readable medium may store instructions, the instructions, when executed by at least one processor, may cause the at least one processor to implement a method comprising: determining an initial time-activity curve of at least one voxel of scanned images based on the scanned images; and at least one of: determining a corrected time-activity curve based on the scanned images or the initial time-activity curve, and determining a parametric image based on the corrected time-activity curve; or determining the parametric image by inputting an input function and the initial time-activity curve into a machine learning model.

In another aspect of the present disclosure, a method for quality evaluation of motion information during a positron emission computed tomography (PET) scan is provided. The method may include: collecting, based on a preset sampling frequency, list mode data and motion information of a region of interest (ROI) of a scanned object during the PET scan; relocating a line of response in the list mode data based on the motion information at each sampling time point to obtain a relocated line of response; generating position information to be evaluated of the ROI at the each sampling time point according to the relocated line of response; and generating a quality evaluation result of the motion information according to a preset quality evaluation index and the position information to be evaluated within a preset sampling time period.

In another aspect of the present disclosure, a method for quality control of motion information during a positron emission computed tomography (PET) scan is provided. The method may include: obtaining a quality evaluation result of motion information of a scanned object by: collecting, based on a preset sampling frequency, list mode data and motion information of a region of interest (ROI) of the scanned object during the PET scan; relocating a line of response in the list mode data based on the motion information at each sampling time point to obtain a relocated line of response; generating position information to be evaluated of the ROI at the each sampling time point according to the relocated line of response; and generating a quality evaluation result of the motion information according to a preset quality evaluation index and the position information to be evaluated within a preset sampling time period; judging whether the quality evaluation result meets a preset quality requirement; and in response to the quality evaluation result does not meet the preset quality requirement, correcting the motion information and/or the list mode data according to a distribution of the position information to be evaluated within a preset sampling time period.

In another aspect of the present disclosure, a system for positron emission computed tomography (PET) data processing is provided. the system may include: a data collection unit configured to collect, based on a preset sampling frequency, list mode data and motion information of a region of interest (ROI) of a scanned object during a PET scan; a position information obtaining unit configured to: relocate a line of response in the list mode data based on the motion information at each sampling time point to obtain a relocated line of response; and generate position information to be evaluated of the ROI at the each sampling time point according to the relocated line of response; and at least one of an evaluation result obtaining unit or a correction unit; wherein the evaluation result obtaining unit is configured to generate a quality evaluation result of the motion information according to a preset quality evaluation index and the position information to be evaluated within a preset sampling time period; and the correction unit is configured to: judge whether the quality evaluation result meets a preset quality requirement; and in response to the quality evaluation result does not meet the preset quality requirement, correct the motion information and/or the list mode data according to a distribution of the position information to be evaluated within a preset sampling time period.

In another aspect of the present disclosure, a system for positron emission computed tomography (PET) imaging is provided. The system may include at least one storage device storing a set of instructions; and at least one processor in communication with the storage device, wherein when executing the set of instructions, the at least one processor may be configured to cause the system to perform operations including: collecting, based on a preset sampling frequency, list mode data and motion information of a region of interest (ROI) of a scanned object during the PET scan; relocating a line of response in the list mode data based on the motion information at each sampling time point to obtain a relocated line of response; generating position information to be evaluated of the ROI at the each sampling time point according to the relocated line of response; and generating a quality evaluation result of the motion information according to a preset quality evaluation index and the position information to be evaluated within a preset sampling time period.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
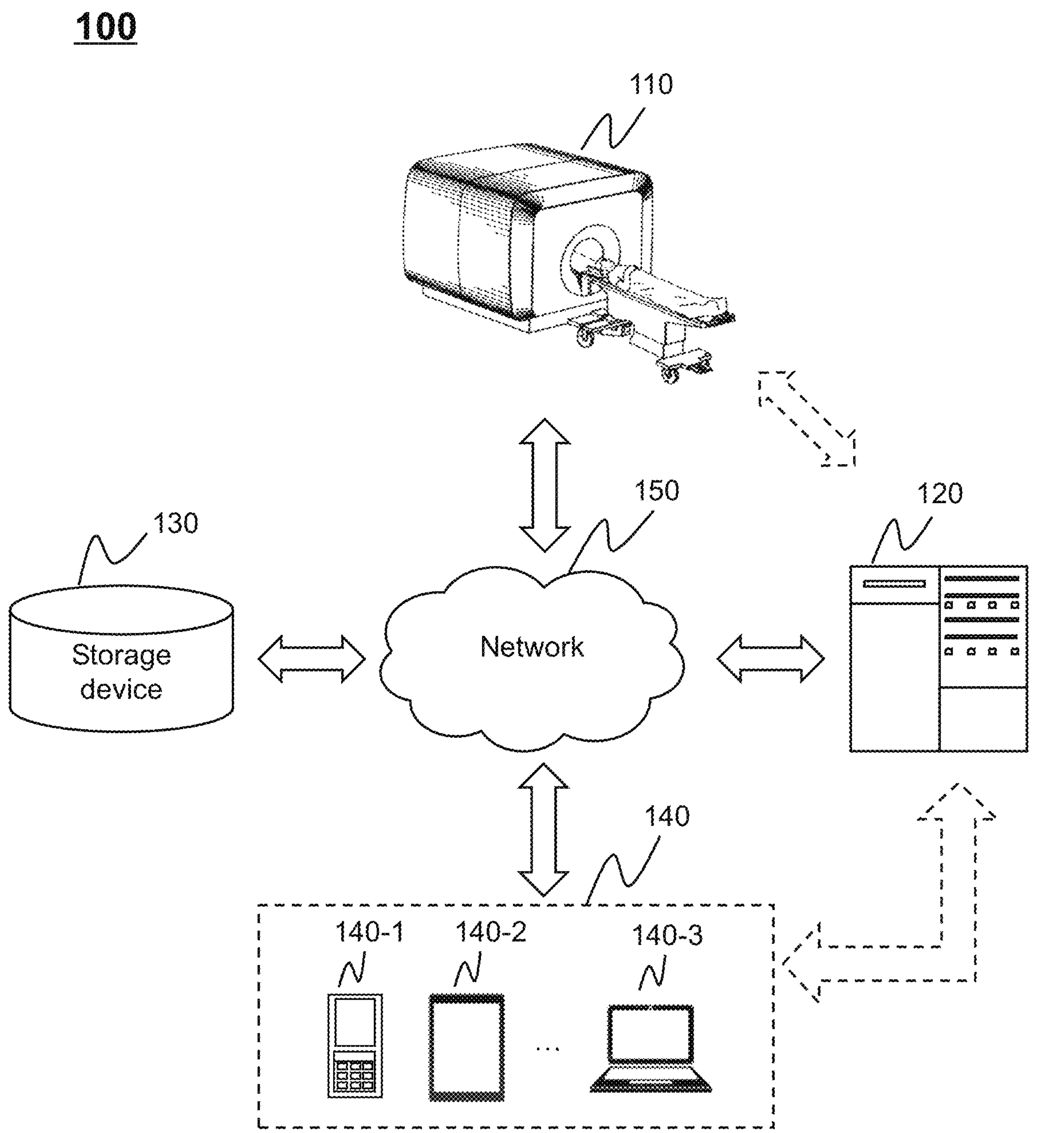
FIG. 1 is a schematic diagram illustrating an application scenario of a system for motion correction of a PET image according to some embodiments of the present disclosure.

The technical solutions of the present disclosure embodiments will be more clearly described below, and the accompanying drawings need to be configured in the description of the embodiments will be briefly described below. Obviously, drawings described below are only some examples or embodiments of the present disclosure. Those skilled in the art, without further creative efforts, may apply the present disclosure to other similar scenarios according to these drawings. Unless obviously obtained from the context or the context illustrates otherwise, the same numeral in the drawings refers to the same structure or operation.

It should be understood that the “system”, “device”, “unit”, and/or “module” used herein are one method to distinguish different components, elements, parts, sections, or assemblies of different levels in ascending order. However, the terms may be displaced by other expressions if they may achieve the same purpose As shown in the present disclosure and claims, unless the context clearly prompts the exception, “a”, “one”, and/or “the” is not specifically singular, and the plural may be included. It will be further understood that the terms “comprise,” “comprises,” and/or “comprising,” “include,” “includes,” and/or “including,” when used in the present disclosure, specify the presence of stated steps and elements, but do not preclude the presence or addition of one or more other steps and elements thereof.

The flowcharts are used in present disclosure to illustrate the operations performed by the system according to the embodiment of the present disclosure. It should be understood that the front or rear operation is not necessarily performed in order to accurately. Instead, the operations may be processed in reverse order or simultaneously. Moreover, one or more other operations may be added to the flowcharts. One or more operations may be removed from the flowcharts.

FIG. 1 is a schematic diagram illustrating an application scenario 100 of a system for motion correction of a PET image according to some embodiments of the present disclosure. In some embodiments, the application scenario 100 for motion correction of the PET image may include a single modality system or a multi-modality system. Exemplarily, the single modality system may include a positron emission tomography (PET) system, or the like. Exemplarily, the multi-modality system may include a positron emission tomography-computed tomography (PET-CT) system, a positron emission tomography-magnetic resonance (PET-MR) system, or the like. In some embodiments, the application scenario 100 for motion correction of the PET image may include modules and/or components for performing the motion correction of the PET image.

Merely by way of example, as shown in FIG. 1, the application scenario 100 for motion correction of the PET image may include a scanning device 110, a processing device 120, a storage device 130, a terminal 140, and a network 150.

The scanning device 110 may include an imaging device, an interventional medical device, or a combination thereof. The imaging device may obtain a scanned image related to at least a part of an object. The object may be biological or non-biological. For example, the object may include a patient, a man-made object, or the like. As another example, the object may include a specific part, an organ, and/or a tissue of a patient. For example, the object may include the head, the neck, the chest, the heart, the stomach, blood vessels, soft tissues, tumors, nodules, or the like, or any combination thereof. Exemplarily, the imaging device may include a PET scanner. Exemplarily, the interventional medical device may include a radiotherapy (RT) device, an ultrasound therapy device, a thermal therapy device, a surgical interventional device, or the like, or any combination thereof.

The processing device 120 may process data and/or information obtained from the scanning device 110, the terminal 140, and/or the storage device 130. For example, the processing device 120 may perform the motion correction of the PET image by processing scanned images obtained by the scanning device 110.

In some embodiments, the processing device 120 may perform the motion correction of the PET image based on one or more models corresponding to the motion correction of the PET image. For example, the processing device 120 may obtain an initial time-activity curve based on a first model. As another example, the processing device 120 may obtain a corrected time-activity curve after motion correction using a machine learning model.

The storage device 130 may store data, instructions, and/or any other information. In some embodiments, the storage device 130 may store data obtained from the terminal 140 and/or the processing device 120. The data may include the scanned images obtained by the processing device 120, models for processing the scanned images, information related to components of the processing device 120, or the like. For example, the storage device 130 may store the scanned images obtained by the scanning device 110. As another example, the storage device 130 may store one or more models for processing the scanned images.

In some embodiments, the storage device 130 may be connected to the network 150 to communicate with one or more other components (e.g., the processing device 120, the terminal 140, etc.) of the application scenario 100 for motion correction of the PET image. The one or more other components of the application scenario 100 for motion correction of the PET image may access data or instructions stored in the storage device 130 via the network 150. In some embodiments, the storage device 130 may be a part of the processing device 120.

The terminal 140 may include a mobile device 140-1, a tablet computer 140-2, a laptop computer 140-3, or the like, or any combination thereof. In some embodiments, the terminal 140 may be a part of the processing device 120.

In some embodiments, the terminal 140 may send and/or receive information related to the motion correction of the PET image to/from the processing device 120 via a user interface. In some embodiments, the user interface may be in a form of an application for implementing the motion correction of the PET image on the terminal 140. The user interface may be configured to facilitate communication between the terminal 140 and a user associated with the terminal 140. In some embodiments, the user interface may receive an input of a request for performing the motion correction on the PET image from the user, for example, via a user interface screen. The terminal 140 may send the request for performing the motion correction on the PET image to the processing device 120 via the user interface to obtain kinetic related parameters.

The network 150 may include any suitable network that may facilitate information and/or data exchange of the application scenario 100 for motion correction of the PET image. In some embodiments, one or more components (e.g., a PET scanner) of the scanning device 110, the terminal 140, the processing device 120, the storage device 130 may transmit the information and/or data via the network 150 and the one or more other components of the application scenario 100 for motion correction of the PET image.

It should be noted that the above descriptions of the application scenario 100 for motion correction of the PET image are merely provided for the purposes of illustration and are not intended to limit the scope of the embodiments. For those skilled in the art, a plurality of variations and modifications may be made under the teachings of the embodiments. For example, the assembly and/or functionality of the application scenario 100 for motion correction of the PET image may be varied or altered depending on a particular implementation scheme. Merely by way of example, some other components may be added to the application scenario 100 for motion correction of the PET image, such as a power module that may power one or more components of the application scenario 100 for motion correction of the PET image, and other devices or modules.

Figure 2:
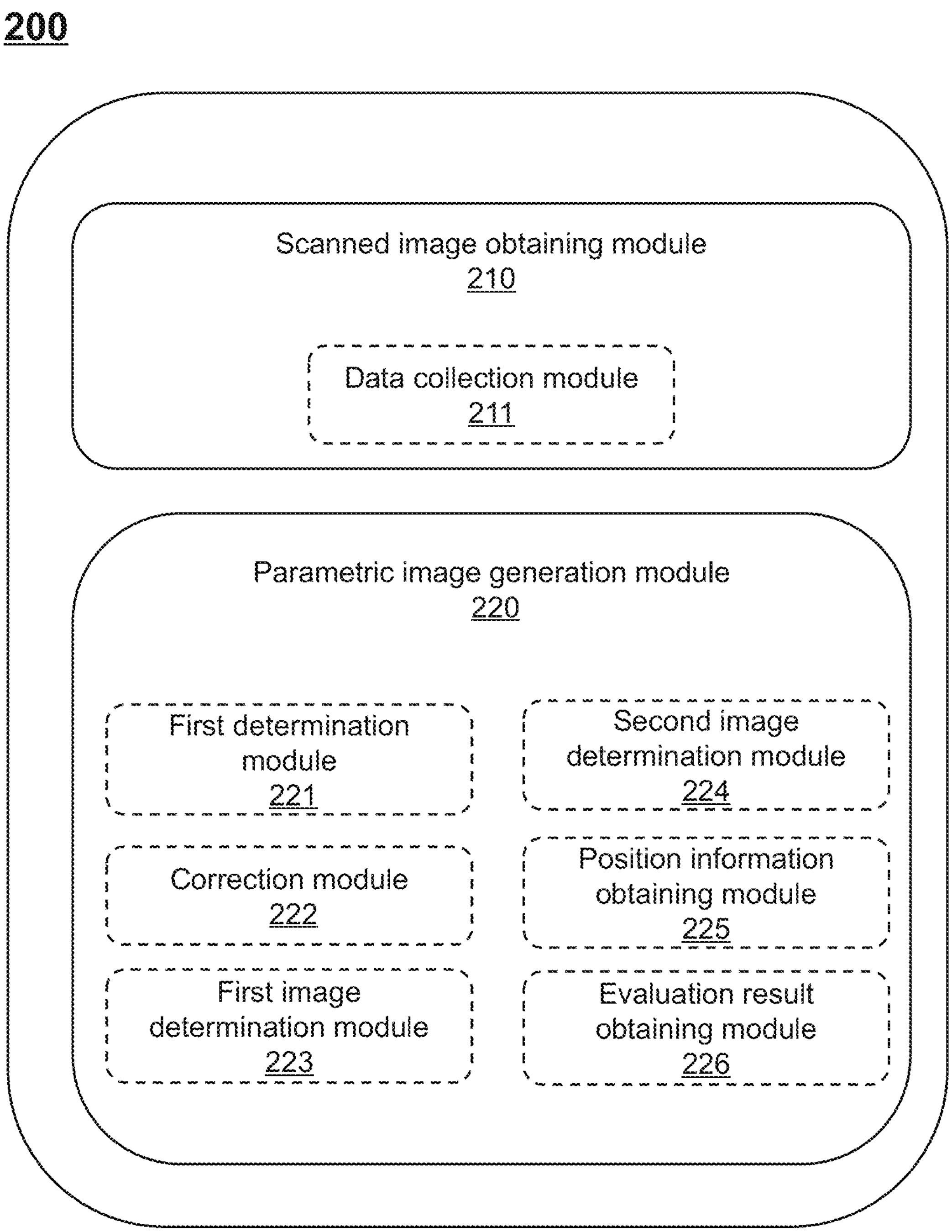
FIG. 2 is a block diagram of the system for motion correction of the PET image according to some embodiments of the present disclosure.

FIG. 2 is a block diagram of the system for motion correction of the PET image according to some embodiments of the present disclosure.

As shown in FIG. 2, the system 200 for motion correction of the PET image may include a scanned image obtaining module 210 and a parametric image generation module 220.

The scanned image obtaining module 210 may be configured to obtain scanned images of a scanned object generated at a plurality of time points. For more information about the scanned images, please refer to relevant descriptions of step 310.

The parametric image generation module 220 may be configured to determine a parametric image by performing a correction processing on the scanned images generated at the plurality of time points. The correction processing may be used to correct an influence generated by a motion of the scanned object on the scanned images. For more descriptions about the correction processing, please refer to related descriptions of step 320.

In some embodiments, the parametric image generation module 220 may further include a first determination module 221, a correction module 222, a first image determination module 223, and a second image determination module 224.

In some embodiments, the first determination module 221 may be configured to determine an initial time-activity curve of at least one voxel of the scanned images based on the scanned images.

In some embodiments, the correction module 222 may be configured to determine a corrected time-activity curve based on the scanned images or the initial time-activity curve.

In some embodiments, the first image determination module 223 may be configured to determine the parametric image based on the corrected time-activity curve.

In some embodiments, the second image determination module 224 may be configured to determine the parametric image by inputting an input function and the initial time-activity curve into a machine learning model.

In some embodiments, the second image determination module 224 may be further configured to determine kinetic parameters by inputting the input function and the initial time-activity curve into the machine learning model; and determine the parametric image based on the kinetic parameters.

In some embodiments, the correction module 222 may be further configured to: determine a target region based on a target voxel of the scanned images; and determine a corrected time-activity curve of the target voxel using the machine learning model based on the scanned images or the initial time-activity curve(s) of the target voxel and adjacent voxels in the target region.

In some embodiments, the second image determination module 224 may be further configured to: determine the target region based on the target voxel; and determine the kinetic parameters and/or the parametric image of the target voxel using the machine learning model based on the input function and the initial time-activity curve(s) of the target voxel and the adjacent voxels in the target region.

In some embodiments, the target region may include the target voxel at a central position of the target region and the adjacent voxels of the target voxel.

In some embodiments, the parametric image generation module 220 may also include a training module (not shown). In some embodiments, the training module and the first determination module 221 (and/or the correction module 222, the first image determination module 223, and the second image determination module 224) may be disposed on different processing devices or processors (for example, the training module may be disposed on a server).

In some embodiments, the training module may be configured to obtain the corrected time-activity curve(s) or the kinetic parameters based on a motion-corrected parametric image, wherein the corrected time-activity curve, the kinetic parameters, or the motion-corrected parametric image may be used as a label of training data.

In some embodiments, in the motion correction of the PET image, the corrected time-activity curve(s) may be determined based on the scanned images and then the parametric image may be determined based on the corrected time-activity curve(s). For more descriptions of this process, please refer to FIG. 4, which will not be repeated here.

In some embodiments, in the motion correction of the PET image, the initial time-activity curve of at least one voxel may be determined based on the scanned images, then the corrected time-activity curve may be determined based on the initial time-activity curve, and the parametric image may be further determined based on the corrected time-activity curve. For more descriptions of this process, please refer to FIG. 4, which will not be repeated here.

In some embodiments, in the motion correction of the PET image, the initial time-activity curve of the at least one voxel may be determined based on the scanned images and then the parametric image may be determined by inputting the input function and the initial time-activity curve into the machine learning model. For more descriptions of this process, please refer to FIG. 5, which will not be repeated here.

In some embodiments, in the motion correction of the PET image, the initial time-activity curve of the at least one voxel may be determined based on the scanned images, then the kinetic parameters may be determined by inputting the input function and the initial time-activity curve into the machine learning model, and the parametric image may be further determined based on the kinetic parameters. For more descriptions of this process, please refer to FIG. 6, which will not be repeated here.

As shown in FIG. 2, in some embodiments, the scanned image obtaining module 210 may include a data collection module 211. The parametric image generation module 220 may include a position information obtaining module 225, an evaluation result obtaining module 226, and the correction module 222.

The data collection module 211 may be configured to collect list mode data and the motion information during the PET scan based on a preset sampling frequency.

The position information obtaining module 225 may be configured to relocate a line of response in the list mode data based on the motion information at each sampling time point, and generate the position information to be evaluated of the region of interest at the each sampling time point according to a relocated line of response.

The evaluation result obtaining module 226 may be configured to generate a quality evaluation result of the motion information during the PET scan according to a preset quality evaluation index and the position information to be evaluated within a preset sampling time period.

The correction module 222 may be further configured to judge whether the quality evaluation result meets a preset quality requirement. If not, the correction module 222 may correct the motion information and/or the list mode data according to a distribution of the position information to be evaluated within the preset sampling time period.

Based on at least part of the aforementioned data collection module 211, the position information obtaining module 225, the evaluation result obtaining module 226, and the correction module 222, the quality evaluation and/or information correction of the motion information may be realized. For more descriptions on the process for quality evaluation of the motion information, please refer to FIGS. 11-15, which may not be repeated here.

Figure 3:
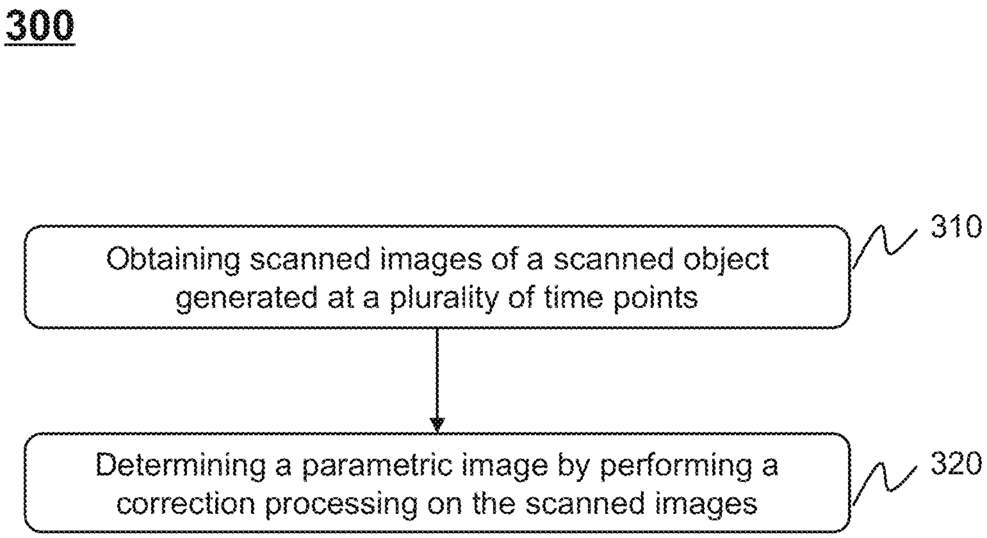
FIG. 3 is a flowchart illustrating an exemplary process for motion correction of a PET image according to some embodiments of the present disclosure.

FIG. 3 is a flowchart illustrating an exemplary process for motion correction of a PET image according to some embodiments of the present disclosure. As shown in FIG. 3, process 300 may include one or more of the following steps. In some embodiments, one or more operations of the process 300 shown in FIG. 3 may be implemented in the system for motion correction of the PET image shown in FIG. 1. For example, the process 300 shown in FIG. 3 may be stored in the storage device 130 in the form of instructions, and called and/or executed by the processing device 120.

In 310, scanned images generated at a plurality of time points may be obtained. In some embodiments, step 310 may be performed by the scanned image obtaining module 210.

The scanned images may refer to medical images obtained by a PET scanning technique on the scanned object. The scanned object may include at least a part of organs of a patient, and the scanned images may present medical images of the corresponding organs. In some embodiments, one or more operations of the process 400 shown in FIG. 4 may be implemented the system shown in FIG. 1.

In some embodiments, continuous scan may be performed on the scanned object to obtain medical images of different positions/angles of the scanned object. Each scanned image obtained based on continuous scan may correspond to an imaging time point when the scanned image is generated.

In some embodiments, a scanned image sequence may be determined according to the corresponding time points of the scanned images. For example, when the lungs of the scanned object are scanned continuously, a scanning position may be moved 5 cm from top to bottom to continuously scan the lungs, and a plurality of generated scanned images may be arranged in sequence according to generation time points to obtain a continuous scanned image sequence of the lungs.

In some embodiments, the scanned image obtaining module 210 may obtain the scanned images of the scanned object generated at the plurality of time points through the scanning device 110. In some embodiments, the scanning device 110 may directly scan the scanned object continuously, and store a scanning result including the scanned images generated at the plurality of time points in the storage device 130, and the scanned image obtaining module 210 may directly obtain the scanning result from the storage device 130.

In 320, a parametric image may be determined by performing a correction processing on the scanned images generated at the plurality of time points. The correction processing may be configured to correct an influence generated by a motion of the scanned object on the scanned images. In some embodiments, step 320 may be performed by the parametric image generation module 220.

The parametric image may be an image reflecting parameter information of the scanned object at a corresponding position. A specific parameter may be presented in the corresponding position of the parametric image. The parametric image may be used to assist medical personnel in diagnosing and/or treating the scanned object. For example, the parametric image may be a three-dimensional image including a lesion, and the medical personnel may formulate or execute a treatment plan for the scanned object based on the parametric image. As another example, the parametric image may be a scanned image marked with working situations of various organs of the scanned object. The medical personnel may analyze a health situation of the scanned object based on the parametric image.

In some embodiments, the parametric image may be determined based on corrected scanned images. For example, the scanned image generated at each time point may be corrected first, then three-dimensional modeling may be performed based on the plurality of corrected scanned images, and then a three-dimensional model may be identified to determine the lesion range, thereby determining the parametric image.

In some embodiments, the parametric image may include different types of specific parameters. For example, the parametric image may include the lesion range and blood supply situation of a heart region of the scanned object. A plurality of parametric images corresponding to the different types of specific parameters respectively may be determined according to the different types of specific parameters included by the parametric image, and then fusion may be performed on the plurality of parametric images. For example, when the parametric image including the lesion range and the blood supply situation of the heart region of the scanned object is determined, a first parametric image marked with the lesion range of the heart region and a second parametric image marked with a blood supply situation of the heart region may be determined respectively, and then the first parametric image may be fused with the second parametric image to determine the parametric image including the lesion range and the blood supply situation of the heart region of the scanned object.

In some embodiments, before being fused, different parametric images may be normalized first, and then the parameters may be marked in the normalized parametric images based on label positions of the parameters before fusion and a deformation generated by normalization, thereby obtaining a fused parametric image.

In some embodiments, the parametric image may be a rate constant parametric image in a compartment model. For example, the parametric image may represent a rate constant K1 from plasma to tissue. In some embodiments, the parametric image may be a comprehensive parametric image determined based on the compartment model. For example, the parametric image may represent a net metabolic rate Ki, a binding potential BP, etc. In some embodiments, the rate constant parametric image in the compartment model may be fused with the comprehensive parametric image determined based on the compartment model to reflect the information of the compartment model more comprehensively. A fused parameter model may include parameters, such as the rate constant K1 marked at the corresponding position, the net metabolic rate Ki, the binding potential BP, etc.

In some embodiments, if the scanned images generated at the plurality of time points are corrected, the correction may be performed based on feature information of the scanned images and change(s) thereof. For example, the feature information may include a position of a specific organ (such as the heart) in the scanned images. When the correction is performed, a motion situation of the scanned object may be estimated based on the displacement and deformation of the specific organ at different time points, and then the scanned images generated at the plurality of time points may be corrected based on the motion of the scanned object.

In some embodiments, the feature information may be the time-activity curve of the at least one voxel in the scanned images, wherein the time-activity curve (TAC) may refer to a curve (with time as the abscissa and activity concentration as the ordinate) formed by a certain region/voxel(s)/pixel(s) in the scanned images. In some embodiments, the time-activity curve may include a plasma/blood time activity curve (BTAC), a tissue time activity curve (TTAC), etc. For more information about performing the correction based on the time-activity curve, please refer to FIG. 4 and related descriptions thereof.

Based on the motion correction of the PET scanned image described in some embodiments of the present disclosure, changes in the scanned image caused by motion of the scanned object can be automatically detected, thereby automatically correcting the scanned images. In addition, relevant parameters of a scanned image correction processing may also be used to determine the parametric image, which can improve a utilization rate of information and speed up an overall operation speed.

Figure 4:
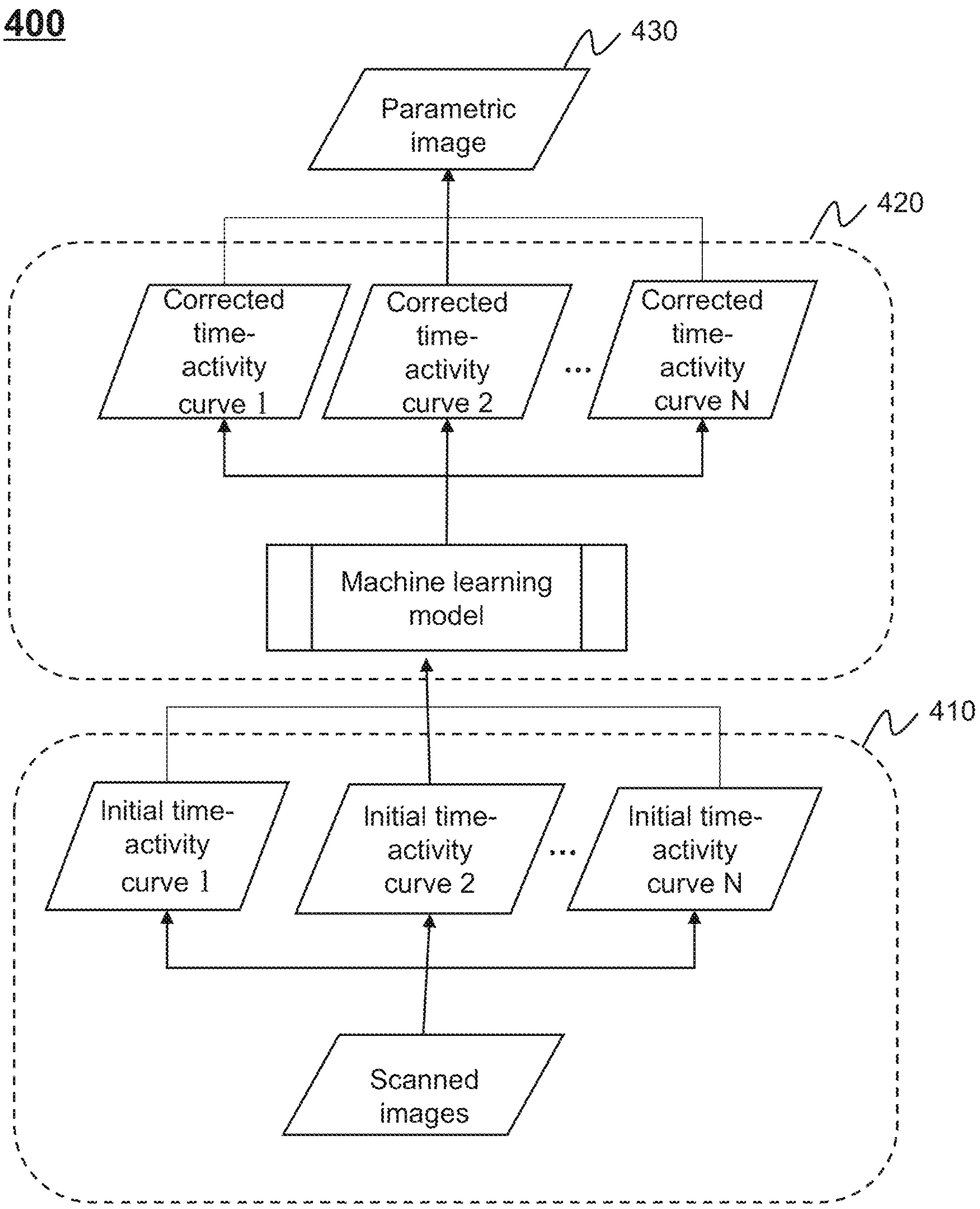
FIG. 4 is a flowchart illustrating another exemplary process for motion correction of a PET image according to some embodiments of the present disclosure.

FIG. 4 is a flowchart illustrating another exemplary process for motion correction of a PET image according to some embodiments of the present disclosure. As shown in FIG. 4, process 400 may include one or more of the following steps. In some embodiments, one or more operations of the process 400 shown in FIG. 4 may be implemented in the system for motion correction of the PET image shown in FIG. 1. For example, the process 400 shown in FIG. 4 may be stored in the storage device 130 in the form of instructions, and called and/or executed by the processing device 120.

In 410, an initial time-activity curve of at least one voxel may be determined based on the scanned images. In some embodiments, step 410 may be performed by the first determination module 221.

The voxel may be a distinguishable element of a smallest unit in a three-dimensional scanned image. In some embodiments, the spatial location features of voxels may be used in the image segmentation process.

The time-activity curve (or the input function) may be obtained in various feasible ways, such as obtained based on a blood sampling analysis (a gold standard), an image-derived input function (IDIF), a population-based input function (PBIF), etc. For each voxel, there may be activity concentrations corresponding to a plurality of frames of scanned images, which may be used to draw a curve of the activity concentration of the voxel changing over time in different frames.

In some embodiments, a time activity curve may be obtained based on a region of interest (ROI) in the scanned images. The region of interest may refer to a region of interest in the scanned images, and the scanned images may be images obtained through a computed tomography (CT) scan or a PET scan. In some embodiments, the region of interest may be a region associated with the heart or arteries. For example, the region of interest may be a heart blood pool, an arterial blood pool, etc. The region of interest may be a two-dimensional or three-dimensional region, and the value of each pixel or voxel thereof may reflect the activity concentration of the scanned object at the corresponding position. The region of interest may be a fixed region in each frame of the scanned images, and the fixed region in the plurality of frames of the scanned images may provide a dynamic data change. In some embodiments, the region of interest may be determined based on a CT image obtained by a CT scan, or determined based on a PET image obtained by a PET scan. For example, a corresponding region with a blood pool in a CT image of the heart may be used as the region of interest. In some embodiments, the region of interest may also be obtained by correspondingly mapping the region of interest determined based on the CT image onto the PET image.

The time-activity curve may be obtained in various feasible ways, such as obtained based on the blood sampling analysis (the gold standard), the image-derived input function (IDIF), the population-based input function (PBIF), etc. For each voxel, there may be activity concentrations corresponding to a plurality of frames of scanned images, which may be used to draw a curve of the activity concentration of the voxel changing over time in different frames.

The initial time-activity curve may be a time-activity curve before the motion correction (i.e., a time-activity curve determined based on the scanned images before the motion correction). The initial time-activity curve (or the input function) may be obtained in various feasible ways, such as obtained based on the blood sampling analysis (the gold standard), the image-derived input function (IDIF), the population-based input function (PBIF), etc.

In some embodiments, the initial time-activity curve may also be obtained by the first model. The first model may refer to a processing model that may perform operations on the obtained scanned images to output the initial time-activity curve of each voxel in the scanned images. In some embodiments, the first model may be a machine learning model. For example, the first model may include at least one of a convolutional neural network (CNN) machine learning model, a fully convolutional neural network (FCN) model, and a generative adversarial network (GAN) model. In some embodiments, the first model may also include other models, which may be determined according to actual requirements.

In 420, a corrected time-activity curve may be determined based on the initial time-activity curve. In some embodiments, step 420 may be performed by the correction module 222.

The corrected time-activity curve may be a time-activity curve obtained after the motion correction. The motion correction may be an operation for correcting a deviation caused by a motion of the scanned object. In some cases, the initial time-activity curve may not be accurate enough due to a possible motion of the scanned object during the scan. By determining the corrected time-activity curve through the motion correction, information with better effect can be obtained.

In some embodiments, the determining the corrected time-activity curve based on the scanned images may be performed using a correction algorithm or a machine learning model.

In some embodiments, the determining the corrected time-activity curve based on the initial time-activity curve may be performed using the correction algorithm or the machine learning model.

In some embodiments, the corrected time-activity curve may be determined by performing motion detection and motion correction on the initial time-activity curve. The motion detection may be an operation for obtaining a motion deformation field through an external device or data-driven. The motion correction may be an operation for performing a motion deformation based on the image or adding the deformation field to the image reconstruction process to implement the motion correction.

The machine learning model may refer to a processing model that may perform the motion correction on the initial time-activity curve to output the corrected time-activity curve after the motion correction. In some embodiments, the machine learning model may be obtained based on the training of a deep learning neural network. More descriptions of the training of the machine learning model may be found in FIG. 9 and relevant descriptions thereof.

In some embodiments, the machine learning model may be constructed based on a deep learning neural network model. Exemplarily, the deep learning neural network model may include a CNN model, an FCN model, a GAN, a backpropagation (BP) machine learning model, a radial basis function (RBF) machine learning model, a deep belief network (DBN), an Elman machine learning model, or the like, or any combination thereof. For more descriptions of other types of machine learning model, please refer to FIG. 7.

In some embodiments, an input of the machine learning model may be the initial time-activity curve. The initial time-activity curve may be input into the machine learning model in a form of a whole curve.

In some embodiments, an output of the machine learning model may be the corrected time-activity curve. For more embodiments of obtaining the corrected time-activity curve based on the machine learning model, please refer to FIG. 7.

In 430, the parametric image may be determined based on the corrected time-activity curve. In some embodiments, step 430 may be performed by the first image determination module 223.

In some embodiments, corrected kinetic parameters may be obtained using a kinetic model based on the input function and the corrected time-activity curve. An input of the kinetic model may include the input function and the corrected time-activity curve.

An output of the kinetic model may be the corrected kinetic parameters. For more descriptions of the input function, refer to step 520 below in the present disclosure, which will not be repeated here. Then the parametric image may be determined based on the corrected kinetic parameters. For more descriptions of determining the parametric image based on the corrected kinetic parameters, refer to step 630 below in the present disclosure, which will not be repeated here.

By performing the motion correction on the initial time-activity curve, an error caused by the motion of the main body of the scanned object during the scanning process can be corrected, and the accuracy of the determined parametric image can be improved.

Compared with the TAC analysis, which is limited to the region of interest, the parametric image may obtain a full-scale kinetic analysis result. In addition, by performing the motion correction on the scanned images, the error caused by the motion of the main body of the scanned object during the scanning process can be corrected, and the accuracy of the determined parametric image can be improved, thereby improving the accuracy of the kinetic analysis result. Moreover, the scanned images are directly used as the input function, which can simplify the processing steps and improve the operation speed.

In some embodiments, step 410 in the process 400 may be omitted, that is, the corrected time-activity curve may be directly determined based on the scanned images. For example, the motion detection and motion correction may be performed on the scanned images to determine the corrected time-activity curve. The motion detection may be performed by obtaining a motion deformation field through an external device or data-driven. The motion correction may include performing a motion deformation based on the image or adding the deformation field to the image reconstruction process to implement the motion correction.

The machine learning model used to determine the corrected time-activity curve based on the scanned images may be similar to the machine learning model used to determine the corrected time-activity curve based on the initial time-activity curve. The input of the machine learning model may be scanned images, and the output may be the corrected time-activity curve. For more embodiments of obtaining the corrected time-activity curve based on the machine learning model, please refer to FIG. 7.

Figure 5:
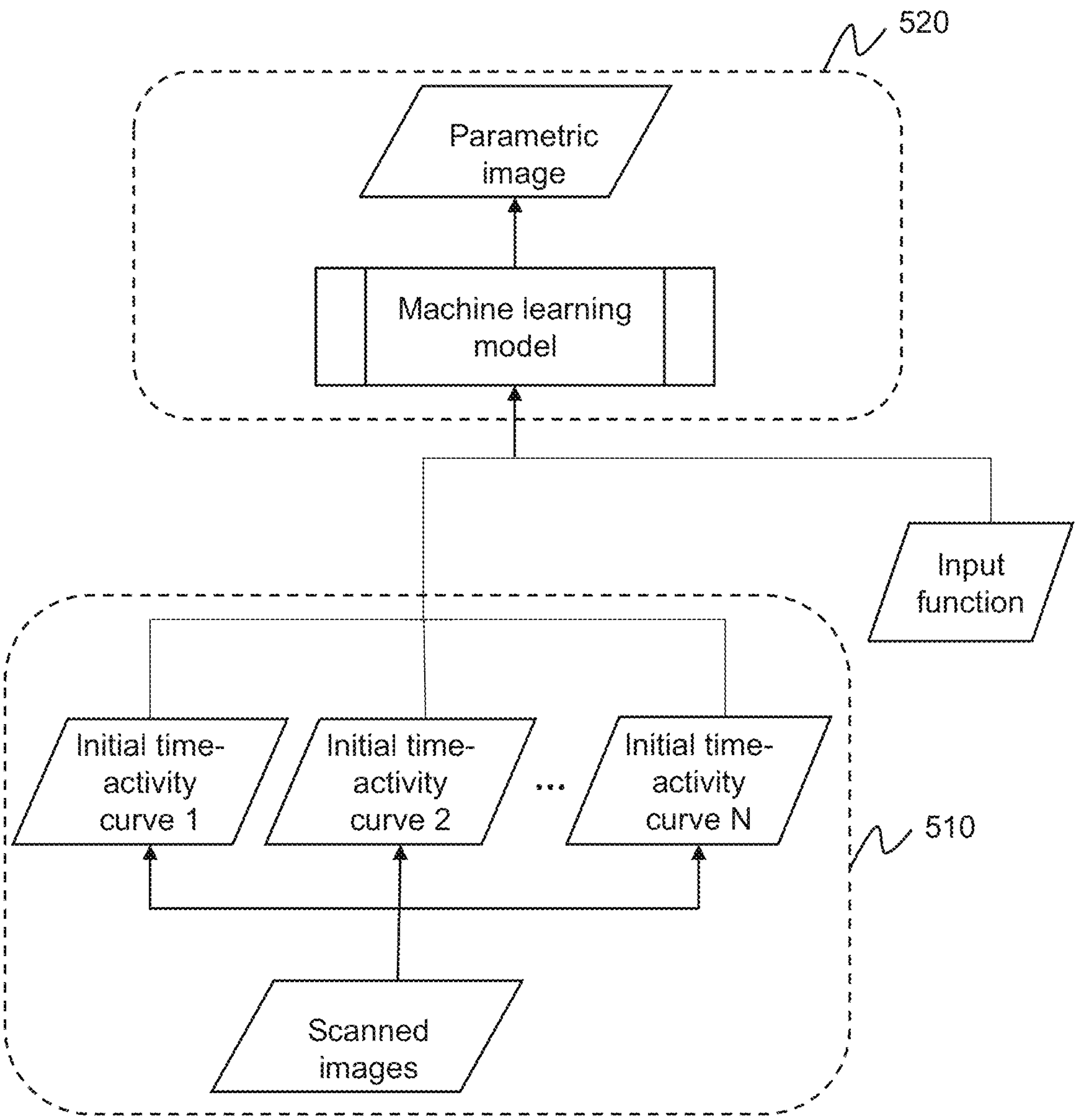
FIG. 5 is a flowchart illustrating another exemplary process for motion correction of a PET image according to some embodiments of the present disclosure.

FIG. 5 is a flowchart illustrating another exemplary process for motion correction of a PET image according to some embodiments of the present disclosure. As shown in FIG. 5, the process 500 may include one or more of the following steps. In some embodiments, one or more operations of the process 500 shown in FIG. 5 may be implemented by the system for motion correction of the PET image shown in FIG. 1. For example, the process 500 shown in FIG. 5 may be stored in the storage device 130 in the form of instructions, and called and/or executed by the processing device 120.

In 510, the initial time-activity curve of the at least one voxel may be determined based on the scanned images. In some embodiments, step 510 may be performed by the first determination module 221.

Step 510 may be similar to step 410 in the present disclosure. For more descriptions of step 510, please refer to step 410 above in the present disclosure, which will not be repeated here.

In 520, the parametric image may be determined by inputting the input function and the initial time-activity curve into a machine learning model. In some embodiments, step 520 may be performed by the second image determination module 224.

The input function may be a curve of a human plasma activity concentration changing over time. In some embodiments, the input function may be obtained by blood collection. For example, during the scanning process, blood samples may be collected at different time points, and the input function may be obtained based on data of the blood samples. In some embodiments, the input function may also be obtained from the dynamic image. For example, the dynamic image may be obtained first, then an ROI of a blood pool may be selected, and a time activity curve (TAC) inside the ROI may be obtained for a related correction (for example, a plasma/whole blood ratio correction, a metabolize rate correction, a partial volume correction, etc.). The time activity curve after the related correction may be determined as the input function. In some embodiments, the input function may also be obtained using a partial group input function to complement the input function.

The machine learning model may refer to a processing model that may perform the motion correction on the input function and the initial time-activity curve to output a motion-corrected parametric image. In some embodiments, the machine learning model may be obtained based on the training of the deep learning neural network. For more descriptions of the training of the machine learning model, please refer to FIG. 9.

In some embodiments, the machine learning model may be constructed based on the deep learning neural network model. Exemplarily, the deep learning neural network model may include a CNN machine learning model, an FCN model, a GAN, a BP machine learning model, an RBF machine learning model, a deep belief network (DBN), an Elman machine learning model, or the like, or any combination thereof. For descriptions of other types of the machine learning model, please refer to FIG. 8.

In some embodiments, the input of the machine learning model may be the input function and the initial time-activity curve.

In some embodiments, the output of the machine learning model may be the motion-corrected parametric image. For more embodiments of obtaining the motion-corrected parametric image based on the machine learning model, please refer to FIG. 8.

By performing the motion correction on the initial time-activity curve, the error caused by the motion of the main body of the scanned object during the scanning process can be corrected, and the accuracy of the determined parametric image can be improved. Moreover, the parametric image is directly output, which can simplify the processing steps, and improve the operation speed.

In some embodiments, the corrected time-activity curve may be determined first so as to determine the parametric image. That is, the corrected time-activity curve may be determined first based on the scanned images or the initial time-activity curve. The input function and corrected time-activity curve may be then inputted into the machine learning model to determine the parametric image. As a result, the accuracy of input variables of the machine learning model can be improved, thereby improving the accuracy of the parametric image.

Figure 6:
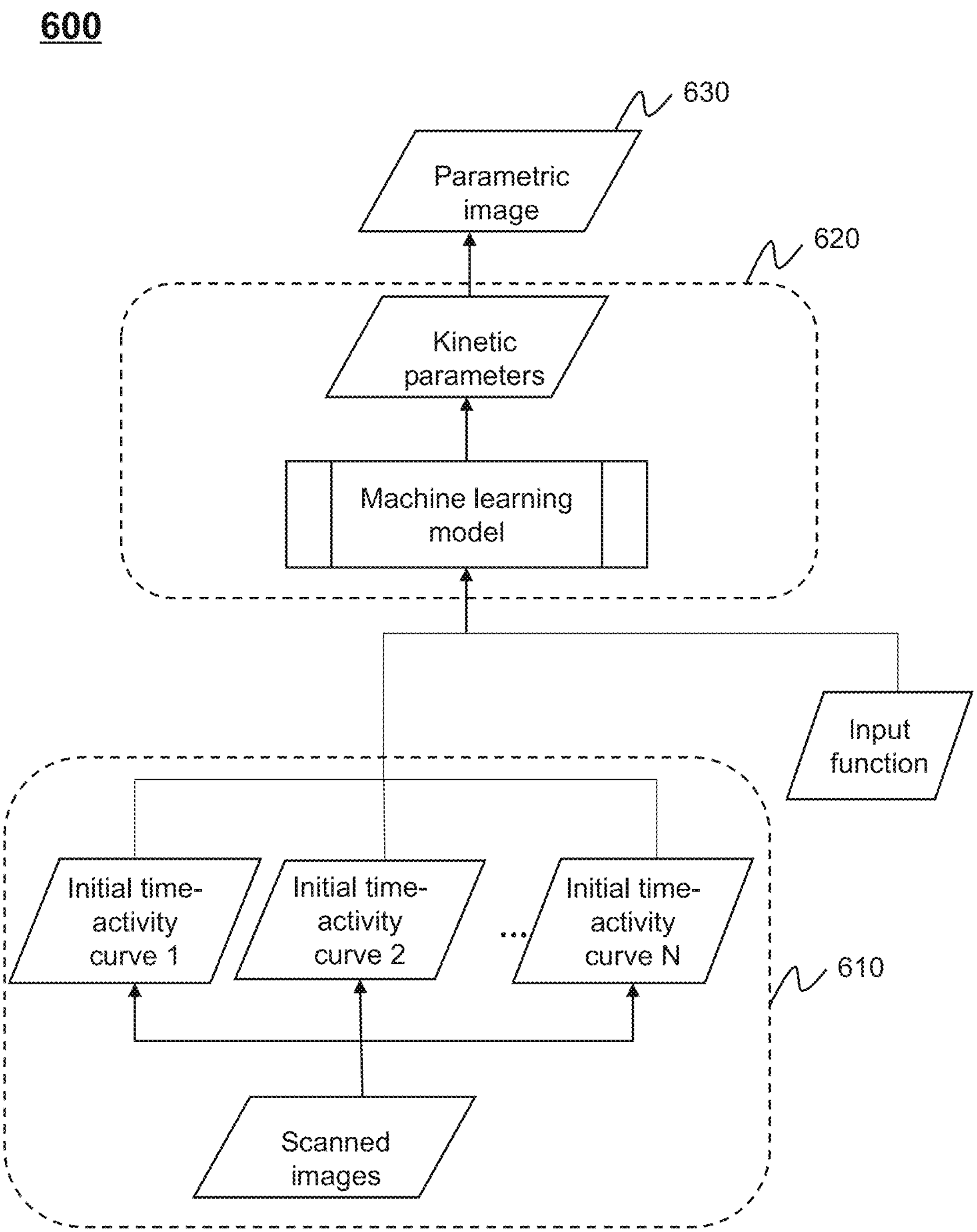
FIG. 6 is a flowchart illustrating another exemplary process for motion correction of a PET image according to some embodiments of the present disclosure.

FIG. 6 is a flowchart illustrating another exemplary process for motion correction of a PET image according to some embodiments of the present disclosure. As shown in FIG. 6, process 600 may include one or more of the following steps. In some embodiments, one or more operations of the process 600 shown in FIG. 6 may be implemented by the system for motion correction of the PET image shown in FIG. 1. For example, the process 600 shown in FIG. 6 may be stored in the storage device 130 in the form of instructions, and called and/or executed by the processing device 120.

In 610, the initial time-activity curve of the at least one voxel may be determined based on the scanned images. In some embodiments, step 610 may be performed by the first determination module 221.

Step 610 may be similar to step 410 in the present disclosure. For more descriptions of step 610, please refer to step 410 above in the present disclosure, which will not be repeated here.

In 620, the input function and the initial time-activity curve may be inputted into a machine learning model to determine the kinetic parameters. In some embodiments, step 620 may be performed by the second image determination module 224.

In some embodiments, each voxel may have a parameter value that may represent a value for the kinetic parameters (also referred to as physiological parameters) of the tracer kinetics. The kinetic parameters may be configured to represent the metabolism of the tracer injected into the sample. Exemplary kinetic-related parameters may include a tracer perfusion rate, tracer receptor binding potential, a tracer distribution in plasma, a tracer distribution in the sample, a tracer transmission rate (i.e., k1) from the plasma to tissue, a tracer transmission rate (i.e., k2) from the tissue to plasma, or the like, or any combination thereof. A local blood flow, a metabolic rate, and a material transmission rate of the sample may be further reflected through the aforementioned distribution values, rate values, etc.

The machine learning model may refer to a processing model that may perform the motion correction on the input function and the initial time-activity curve to output motion-corrected kinetic parameters. In some embodiments, the machine learning model may be obtained based on the training of the deep learning neural network. For more description of the training of the machine learning model, please refer to FIG. 9.

In some embodiments, the machine learning model may be constructed based on the deep learning neural network model. Exemplarily, the deep learning neural network model may include a CNN machine learning model, an FCN model, a GAN, a BP machine learning model, an RBF machine learning model, a deep belief network (DBN), an Elman machine learning model, or the like, or any combination thereof. For more descriptions of other types of the machine learning model, please refer to FIG. 8.

In some embodiments, the input of the machine learning model may be the input function and the initial time-activity curve.

In some embodiments, the output of the machine learning model may be the motion-corrected kinetic parameters. For more descriptions of obtaining the motion-corrected kinetic parameters based on the machine learning model, please refer to FIG. 8.

In 630, the parametric image may be determined based on the kinetic parameters. In some embodiments, step 630 may be performed by the second image determination module 224.

In some embodiments, the parametric image may also be determined based on the kinetic parameters through a traditional iterative algorithm.

In some embodiments, the determination of the parametric image may be realized using a deep learning model.

In some embodiments, the deep learning model may be used to obtain the parametric image based on the kinetic parameters. In some embodiments, the deep learning model may be a CNN model. In some embodiments, the input of the deep learning model may be the kinetic parameters, and the output of the deep learning model may be the parametric image.

In some embodiments, the deep learning model may be obtained based on a plurality of training samples with labels. In some embodiments, the training samples may include at least the kinetic parameters. The labels may include the parametric images. In some embodiments, the labels may be obtained through historical data.

By performing the motion correction on the initial time-activity curve, the error caused by the motion of the main body of the scanned object during the scanning process can be corrected, and the accuracy of the determined parametric image can be improved.

Figure 7:
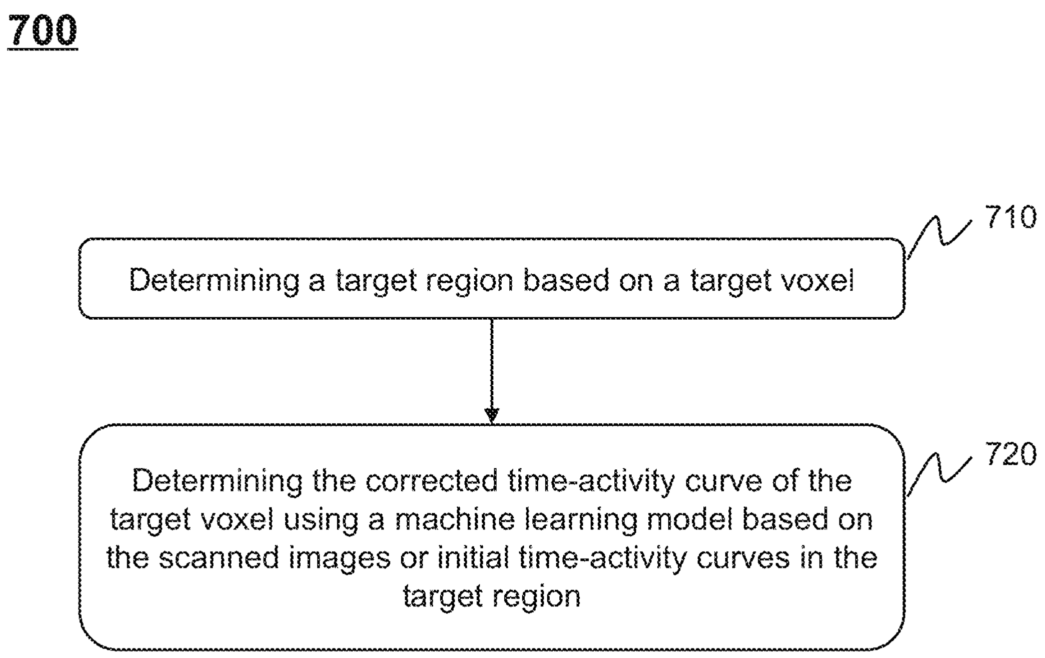
FIG. 7 is a flowchart illustrating an exemplary process for obtaining a corrected time-activity curve according to some embodiments of the present disclosure.

FIG. 7 is a flowchart illustrating an exemplary process for obtaining a corrected time-activity curve according to some embodiments of the present disclosure. As shown in FIG. 7, process 700 may include one or more of the following steps. In some embodiments, one or more operations of the process 700 shown in FIG. 7 may be implemented by the system for motion correction of the PET image shown in FIG. 1. For example, the process 700 shown in FIG. 7 may be stored in the storage device 130 in the form of instructions, and called and/or executed by the processing device 120.

In 710, a target region may be determined based on a target voxel. In some embodiments, step 710 may be performed by the correction module 222.

The target voxel may be a unit in a three-dimensional (3D) image that needs to be corrected. For example, the target voxel may be a pixel at a specific resolution, a space at a specific scale, etc. In some embodiments, each voxel in the region of interest that needs to be corrected may be used as the target voxel.

The target region may be a collection of voxels including the target voxel. In some embodiments, the target region may include the target voxel at a central position of the target region and adjacent voxels of the target voxel.

Figure 10:
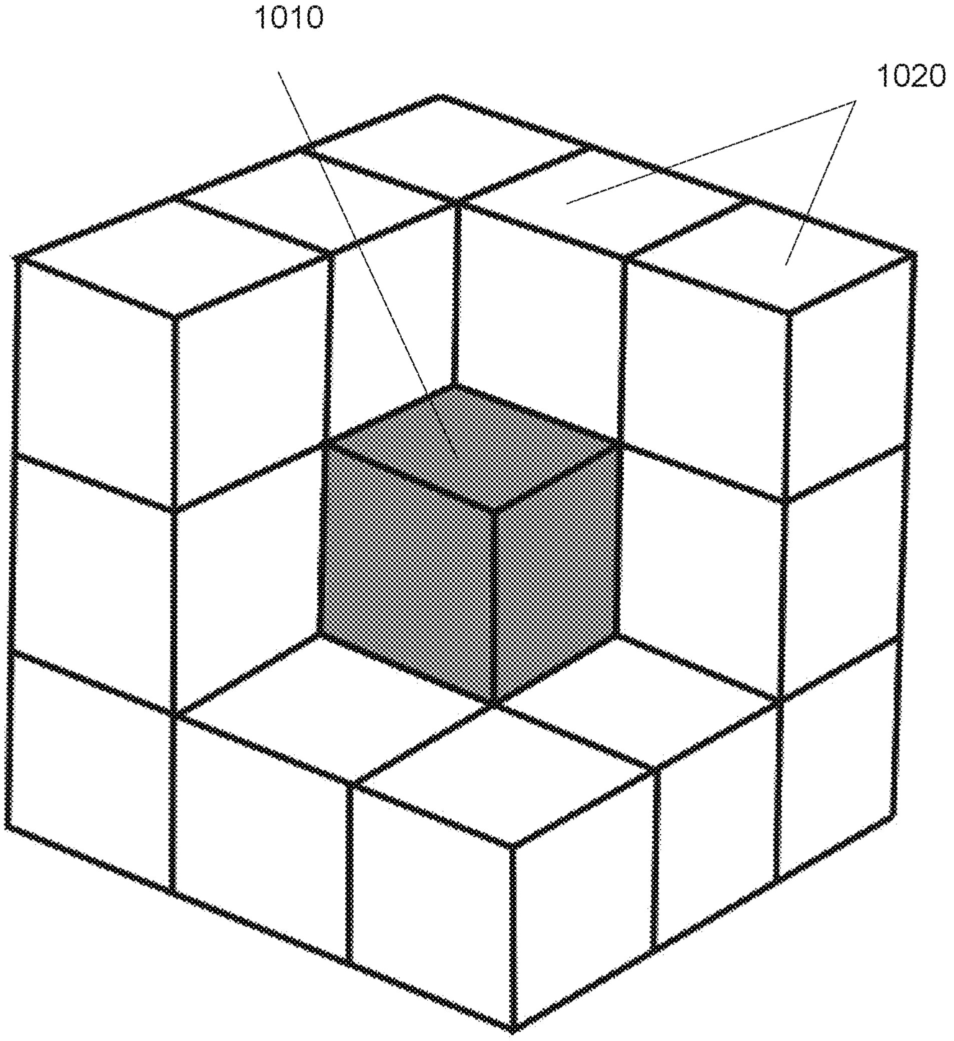
FIG. 10 is a three-dimensional schematic diagram of a partial target region according to some embodiments of the present disclosure.

In some embodiments, the target region may be a cube centered at the target voxel. For example, FIG. 10 is a three-dimensional schematic diagram of a partial target region according to some embodiments of the present disclosure. The target region in FIG. 10 includes 3×3×3 voxels, wherein the central voxel is the target voxel 1010, and other voxels except the central voxel in the target region are adjacent voxels 1020 of the target voxel 1010.

In some embodiments, the target region may be determined based on the target voxel. For example, the target voxel of an image (with a size of X×Y×Z) may be determined, and the target region with the target voxel as the center may be segmented. The size of the target region may be X1×Y1×Z1, where X1≤X, Y1≤Y, and Z1≤Z.

The size of the target region may refer to a count of voxels in the target region. For example, as shown in FIG. 10, the size of the target region is 27 voxels. In some embodiments, the size of the target region may be determined based on a motion amplitude of the scanned object. The processing device 120 may determine the size of the target region according to a preset rule based on the motion amplitude. In some embodiments, the motion amplitude of the scanned object may be determined based on a conventional algorithm (e.g., a centroid of distribution (COD) algorithm). In some embodiments, the motion amplitude may also be determined by a motion detection or a motion monitoring system.

In some embodiments, the size of the target region may be positively correlated with the motion amplitude within a certain range. For example, if the motion amplitude of the scanned object is relatively large, a selection of the target region may be relatively large to ensure the correction effect. As another example, if the motion amplitude of the scanned object is relatively small, the selection of the target region may be relatively small to speed up the correction or avoid interference of irrelevant data.

In 720, the corrected time-activity curve of the target voxel may be determined through a machine learning model based on the scanned images or initial time-activity curves of the target voxel and the adjacent voxels of the target voxel in the target region. In some embodiments, step 720 may be performed by the correction module 222.

In some embodiments, the processing device 120 may input the scanned images or the initial time-activity curve of each voxel in the target region into a trained machine learning model, and the trained machine learning model may output the corrected time-activity curve of the target voxel based on the scanned images or the initial time-activity curve of each voxel in the target region. For example, as shown in FIG. 10, the processing device 120 may input the scanned images or the initial time-activity curves of the target voxel 1010 and adjacent voxels 1020 of the target voxel 1010 in the target region into the trained machine learning model, and the trained machine learning model may output the corrected time-activity curve of the target voxel 1010 by performing the motion correction on the scanned images or the initial time-activity curves of the target voxel 1010 and the adjacent voxels 1020 in the target region.

In some embodiments, the machine learning model may be obtained based on training. For more descriptions of the training of the machine learning model, please refer to FIG. 9.

In some embodiments, the machine learning model may include a recurrent neural network (RNN) machine learning model. In some embodiments, the machine learning model may include a long short-term memory network (LSTM) machine learning model.

For a model based on a time sequence, input features may form a sequence, and features corresponding to each frame of image may form an element in the sequence.

When the RNN machine learning model or the LSTM machine learning model is selected, the initial time-activity curves of each voxel in the target region in multi-frame scanned images may be input to the machine learning model based on a preset order (such as input row by row or column by column). When the CNN machine learning model is selected, it may be necessary to stitch the initial time-activity curves of each voxel in the target region in the multi-frame scanned images according to the preset order first, and then the stitched initial time-activity curves may be inputted into the model. The use of the RNN machine learning model and the LSTM machine learning model may reflect an association impact of the initial time-activity curves.

When the corrected time-activity curve is obtained, each voxel may be used as the central voxel (i.e., the target voxel) to establish the target region. The scanned images or the initial time-activity curves of the central voxel and the adjacent voxels thereof may be input into the model for analysis, to obtain a correlative correction result combining the scanned images or the initial time-activity curves of the central voxel and the adjacent voxels, thereby significantly improving the accuracy of the corrected time-activity curve.

Figure 8:
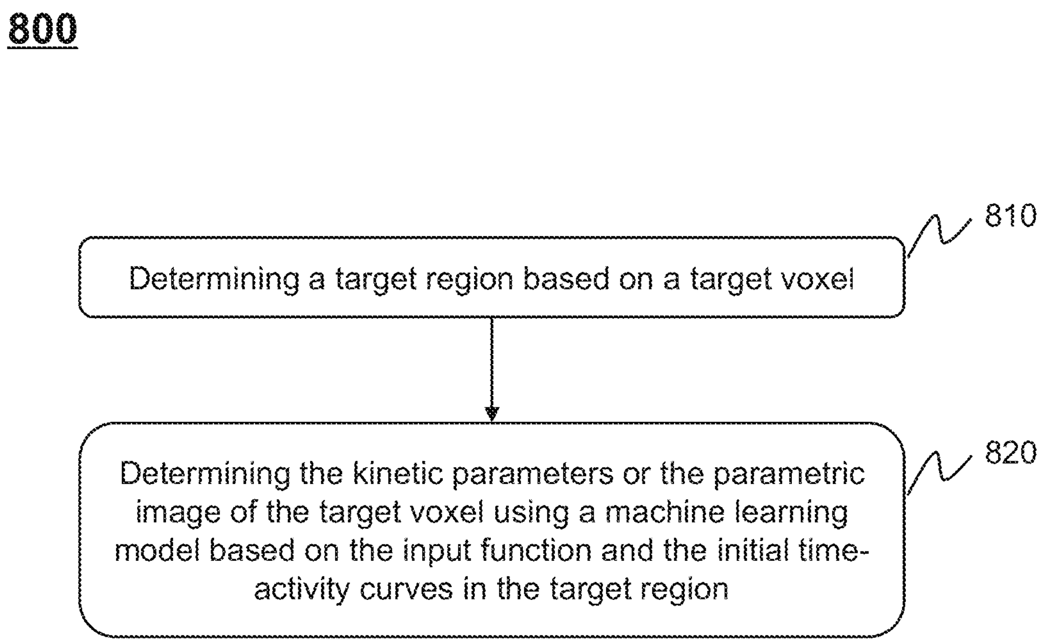
FIG. 8 is a flowchart illustrating an exemplary process for obtaining kinetic parameters or a parametric image according to some embodiments of the present disclosure.

FIG. 8 is a flowchart illustrating an exemplary process for obtaining kinetic parameters or a parametric image according to some embodiments of the present disclosure. As shown in FIG. 8, the process 800 may include one or more of the following steps. In some embodiments, one or more operations of the process 800 shown in FIG. 8 may be implemented by the system for motion correction of the PET image shown in FIG. 1. For example, the process 800 shown in FIG. 8 may be stored in the storage device 130 in the form of instructions, and called and/or executed by the processing device 120.

In 810, the target region may be determined based on the target voxel. In some embodiments, step 810 may be performed by the second image determination module 224.

Step 810 may be similar to step 710 in the present disclosure. For more descriptions of step 810, please refer to step 710 above in the present disclosure, which will not be repeated here.

In 820, the kinetic parameters or the parametric image of the target voxel may be determined through a machine learning model based on the input function and the initial time-activity curves of the target voxel and adjacent voxels in the target region. In some embodiments, step 820 may be performed by the second image determination module 224.

In some embodiments, the processing device 120 may input the input function and the initial time-activity curve of each voxel in the target region into a trained machine learning model, and the trained machine learning model may output the kinetic parameters or the parametric image of the target voxel based on the input function or the initial time-activity curve of each voxel in the target region. For example, as shown in FIG. 10, the processing device 120 may input the input functions or the initial time-activity curves of the target voxel 1010 and adjacent voxels 1020 in the target region into the trained machine learning model, and the trained machine learning model may output the parametric image of the target voxel 1010 by performing the motion correction on the input functions or the initial time-activity curves of the target voxel 1010 and the adjacent voxels 1020 in the target region.

In some embodiments, the machine learning model may be obtained based on training. For more descriptions of the training of the machine learning model, please refer to FIG. 9.

In some embodiments, the machine learning model may include a recurrent neural (RNN) network machine learning model. In some embodiments, the machine learning model may include a long short-term memory (LSTM) network machine learning model. For more descriptions of the machine learning model, please refer to step 720 above in the present disclosure, which will not be repeated here.

When the corrected time-activity curve is obtained, each voxel may be used as the central voxel (i.e., the target voxel) to establish the target region. The input functions and the initial time-activity curves of the central voxel and the adjacent voxels thereof may be input into the model for analysis, to obtain a correlative correction result combining the input functions and the initial time-activity curves of the central voxel and the adjacent voxels, thereby significantly improving the accuracy of the corrected time-activity curve.

Figure 9:
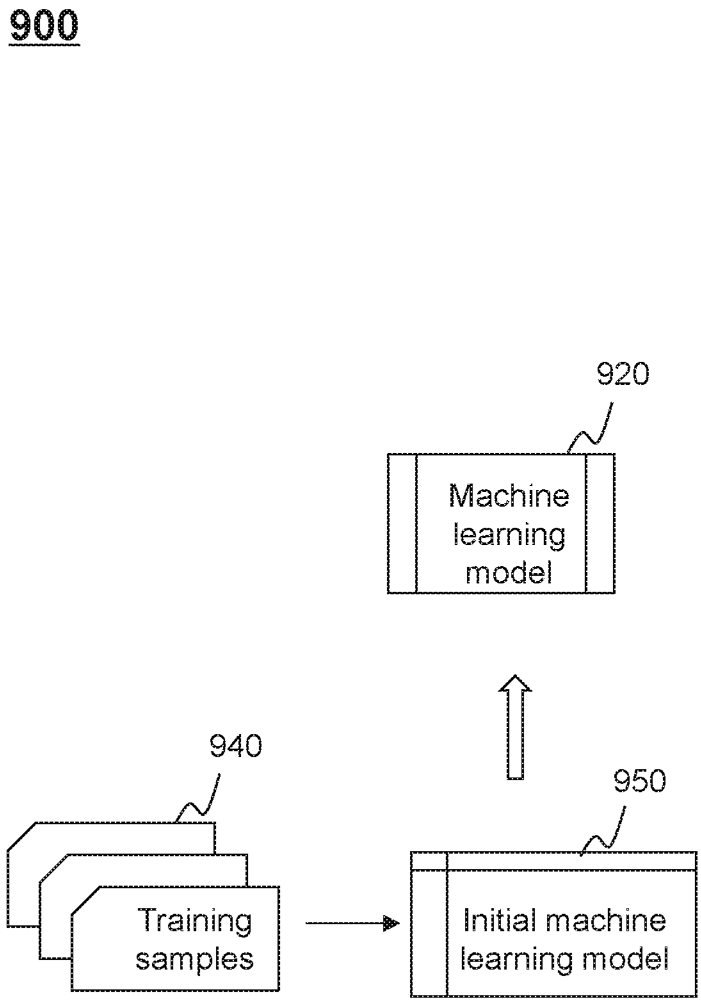
FIG. 9 is a schematic diagram illustrating a training process of a machine learning model according to some embodiments of the present disclosure.

FIG. 9 is a schematic diagram illustrating a training process of a machine learning model according to some embodiments of the present disclosure. As shown in FIG. 9, the process 900 may include one or more of the following steps. In some embodiments, one or more operations of the process 900 shown in FIG. 9 may be implemented by the system for motion correction of the PET image shown in FIG. 1. For example, the process 900 shown in FIG. 9 may be stored in the storage device 130 in the form of instructions, and called and/or executed by the processing device 120.

In some embodiments, the parameters of the machine learning model may be obtained through training using a plurality of training samples with labels. In some embodiments, a plurality of sets of training samples 940 may be obtained, and each set of training samples may include a plurality of training data and labels corresponding to the training data. Taking the machine learning model in FIG. 7 as an example, the training data may include the scanned images or initial time-activity curve of each voxel in each target region, and the labels of the training data may include the time-activity curve after the motion correction of the target voxel in the each target region. Taking the machine learning model in FIG. 8 as an example, the training data may include the input function and the initial time-activity curve of each voxel in each target region, and the labels of the training data may include the motion-corrected kinetic parameters or parametric image of the target voxel in the each target region. The parameters of the initial machine training model 950 may be updated through training using the plurality of sets of training samples 940 to obtain an updated initial machine learning model 950. The parameters of the machine learning model 920 may be determined based on the updated initial machine learning model 950. The parameters may be transmitted from the updated initial machine learning model 950 to the machine learning model 920 in any way.

In some embodiments, the training data of the machine learning model and the labels of the training data may be obtained from historical data. For example, the training data and the labels may be obtained from historical image data collected by the imaging device during historical medical procedures. In some embodiments, the training data of the machine learning model and the labels of the training data may also be obtained through manual input, or calling related interfaces, or the like. In some embodiments, the training samples of the machine learning model and the labels of the training samples may be obtained in any other manner.

In some embodiments, taking the machine learning model in FIG. 7 as an example, the labels of the training data may include a time-activity curve obtained based on the motion-corrected parametric image. In some embodiments, taking the machine learning model in FIG. 8 as an example, the labels of the training data may include the kinetic parameters obtained based on the motion-corrected parametric image or the motion-corrected parametric image.

The motion-corrected parametric image may be an image of the target voxel obtained after the motion correction using a motion correction technique. The motion correction may include motion detection and motion correction. The motion detection may be an operation for obtaining a motion deformation field through an external device or data-driven. The motion correction may be an operation for performing a motion deformation on the image or adding the deformation field to the image reconstruction process to implement the motion correction.

In some embodiments, the parameters of the initial machine learning model 950 may be iteratively updated based on the plurality of training samples, until a loss function of the model satisfies a preset condition. For example, the preset condition may be that the loss function converges or a value of the loss function is smaller than a preset value. When the loss function satisfies the preset condition, the model training may be completed, and the updated initial machine learning model 950 may be obtained. The machine learning model 920 and the updated initial machine learning model 950 may have the same model structure. Specifically, the input of the updated initial machine learning model 950 may be each training sample, and the output may be the corrected time-activity curve, kinetic parameters, or parametric image corresponding to the each training sample.

Through the training of the machine learning model, the trained machine learning model may have a function of motion correction. The motion correction may be performed on the scanned images obtained by the imaging device, to correct the error caused by the motion of the main body of the scanned object during the scanning process, and improve the quality of the image, thereby improving the accuracy of the pharmacokinetic analysis.

In some embodiments, a device for motion correction of the PET image may include a processor and a memory; the memory may be used to store instructions, and when executed by the processor, the instructions may cause the device to implement the method for motion correction of the PET image.

In some embodiments, a computer-readable storage medium may store computer instructions, and after reading the computer instructions in the storage medium, the computer may execute the method for motion correction of the PET image.

In some embodiments of the present disclosure, the corrected parametric image may be obtained through the motion correction. The motion correction may be performed on the scanned images obtained by the imaging device, which can correct the error caused by the motion of the main body of the scanned object during the scanning process, and improve the quality of the image, thereby improving the accuracy of the pharmacokinetic analysis. Moreover, a correlation between the target voxel and the adjacent voxels of the target voxel can be taken into account, and the corrected data can be more accurate.

In some embodiments, during a PET scan, the body of the scanned object may inevitably move because the PET scan takes a relatively long time. If the PET image is reconstructed directly based on collected PET scan data, artifacts may appear in a reconstructed PET image, resulting in poor image quality, and may affect a diagnosis and treatment by a doctor. In order to improve the imaging quality of medical images and obtain high-quality PET images, motion information may be usually corrected during the PET scan.

In some embodiments, considering that there may be errors in the motion information determined based on the algorithm or the detector, correcting the scanned images directly based on the motion information may cause the corrected scanned image to be inaccurate and cannot be used to produce the parametric image. In addition, abnormal special actions (such as a detector falling off, movements with a large amplitude, etc.) of the patient during the scan may also cause the corrected scanned images to be inaccurate.

In some embodiments, a quality assessment of the motion correction may be performed. However, the quality control of the motion correction mainly relies on a subjective evaluation or regional quantitative evaluation of reconstructed images by professionals, which consumes manpower and material costs and is inefficient. Moreover, a situation that the PET image cannot meet the needs of diagnosis and treatment may not be avoided, and the patient may only be re-scanned. The re-scan may not only reduce the efficiency of PET image reconstruction but also cause further waste of the manpower and material costs. At the same time, an unnecessary scanning burden may be added to the patient, which is not conducive to the physical and mental health of the patient.

Based on the above technical problems, the present disclosure may also provide a method for evaluating motion information. Before correcting the scanned images, a quality evaluation may be performed on the motion information used to correct the scanned images to analyze whether the corrected scanned image is normal and whether it may be used to generate the parametric image.

In some embodiments, considering that the evaluation process of the motion information requires original data during imaging, before further explaining how to determine a quality evaluation result, an imaging principle of a system for PET imaging may be described in the present disclosure.

Before the PET scan, a drug/tracer labeled with radioactive elements may be injected into the body of the patient first. During the PET scan, the drug/tracer may emit a positron through decay, which may annihilate with a surrounding electron to produce a pair of photons that exit in opposite directions. If the pair of photons are detected by the detectors of the system for PET imaging at the same time, a radioactive isotope may be considered to be on a line of a pair of detectors that captured the photons. The line may be called a line of response (LOR). The collection of all lines of response in the PET scanning process may constitute the original data of the PET image reconstruction, which may be also called list mode data. At the same time, a motion tracking device may collect the motion information and send the collected motion information to the imaging device of the system for PET imaging. The system for PET imaging may usually adopt a continuous scanning mode, so that the imaging device of the system for PET imaging may reconstruct the PET images (such as 3D medical images) according to the list mode data and the motion information.

It should be noted that the list mode data may be data that does not include time-of-flight (TOF) information or data that includes the TOF information. The present disclosure does not make any limitation thereto. As those skilled in the art may understand, if the list mode data includes the TOF information, only a center point of a TOF box may need to be projected for each LOR to represent the each LOR in a subsequent back-projection-related process.

Figure 11:
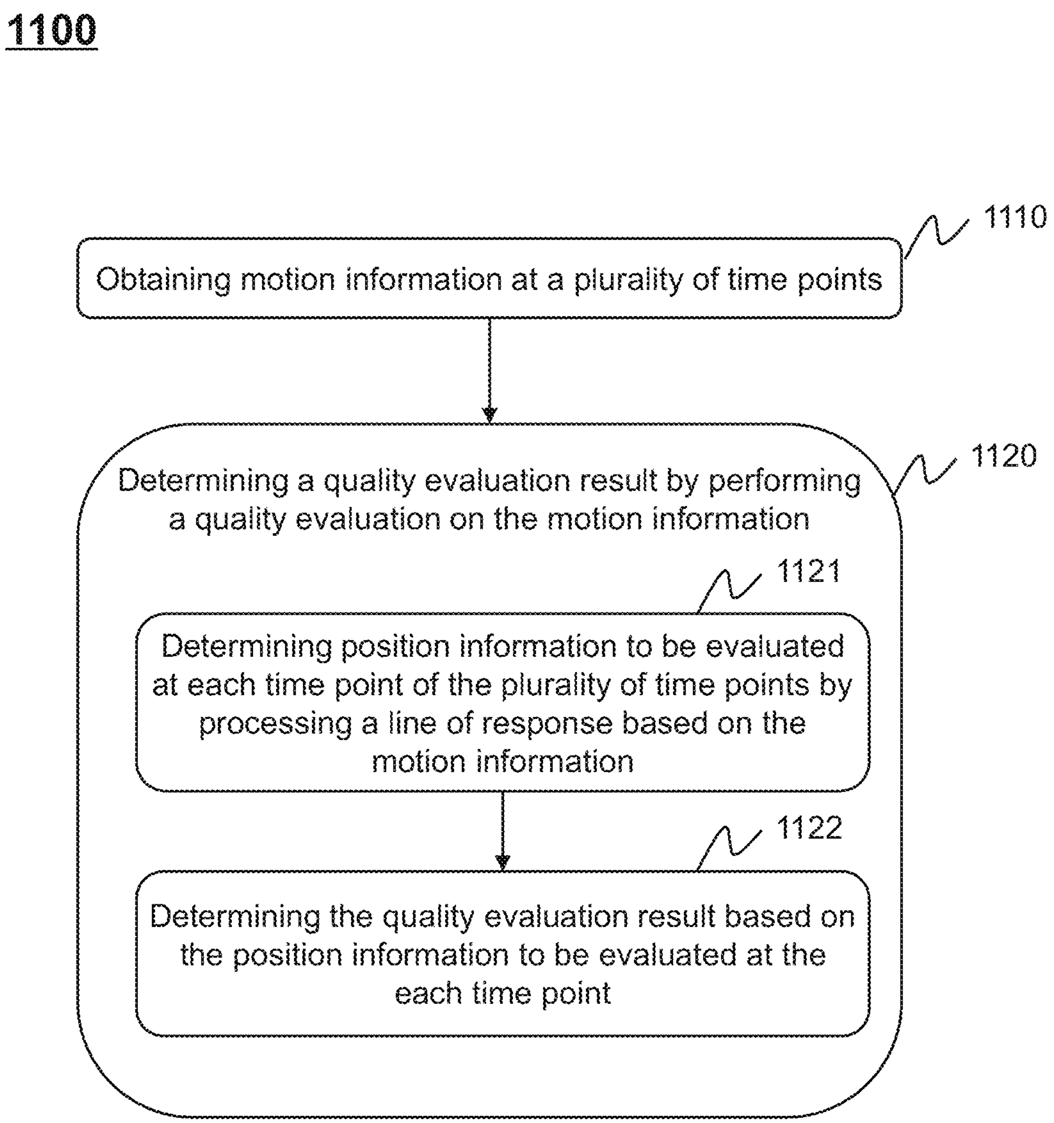
FIG. 11 is a flowchart illustrating an exemplary process for quality evaluation of motion information according to some embodiments of the present disclosure.

FIG. 11 is a flowchart illustrating an exemplary process for quality evaluation of motion information according to some embodiments of the present disclosure. As shown in FIG. 11, process 1100 may include one or more of the following steps. In some embodiments, one or more operations of the process 1100 shown in FIG. 11 may be implemented by the system for motion correction of the PET image shown in FIG. 1. For example, the process 1100 shown in FIG. 11 may be stored in the storage device 130 in the form of instructions, and called and/or executed by the processing device 120.

In 1110, the movement information of the patient at the plurality of time points may be obtained. In some embodiments, step 1110 may be performed by the data collection module 211.

The motion information may refer to data characterizing the motion of the scanned object (e.g., the patient) during the scan. For example, the motion information may be characterized as rigid motion information based on six degrees of freedom of head motion, limb motion, or the like. As another example, the motion information may also be characterized as non-rigid motion information, such as blood motion, heartbeat motion, respiratory motion, etc.

The motion information may include a motion situation of the patient during the scan determined by hardware devices or software algorithms. In some embodiments, the motion information may be determined based on the aforementioned correction data of the scanned images. For example, when correcting the scanned images, the motion situation of the patient during the scan may be determined based on changes in feature data (such as a specific organ, an activity curve, etc.) at each time point in the scanned images and may be designated as the motion information. Exemplarily, the motion information may be estimated according to a displacement and shape change of a specific organ in the scanned images. When the specific organ moves, it may indicate that the patient may move along a displacement direction. When the specific organ is deformed, it may indicate that the patient may move or deform along the direction of the deformation, such as bending, turning, etc.

In some embodiments, the motion information may also be recorded by the hardware devices. The present disclosure does not impose any limitation on the collection device for collecting the patient movement information. The collection device may include but not limited to a scanner, a tracker, and/or other video recording devices, and may include software algorithms. For example, the motion information may be determined through motion images collected by an image sensor. As another example, the motion information may be determined according to a motion sensor provided on the patient. Further, the motion tracking device may be a component of the system for PET imaging or an independent device communicatively connected with the system for PET imaging.

In some embodiments, the accuracy of the motion information may be improved by performing a fusion on various types of motion information. For example, the motion information recorded by the hardware device may be fused with the motion information determined by the correction algorithm to obtain fused motion information.

In 1120, the quality evaluation result may be determined by performing a quality evaluation on the motion information. In some embodiments, step 1120 may be performed by the position information obtaining module 225.

The quality evaluation result may refer to an evaluation of whether there is an abnormality in the motion information. If the quality evaluation result is normal (for example, relevant indexes meet a preset quality requirement), the scanned images may be directly corrected based on the motion information. If the quality evaluation result is abnormal (for example, the relevant indexes do not meet the preset quality requirement), it means that there may be an abnormality in the motion information and/or the original data, and further processing may be required. For example, a specific region may be rescanned based on a specific abnormality. As another example, abnormal motion information and/or list mode data may be corrected based on the quality evaluation result. For more details about correcting the motion information and/or list mode data (original data), please refer to FIG. 15 and related descriptions thereof, which will not be repeated here.

In some embodiments, the quality evaluation result may be determined based on relocated original data.

The relocated original data may refer to data obtained by relocating the original data (such as each line of response) according to the motion information. For example, taking the position of the patient when the patient starts to be scanned as a reference position, the patient motion data may be characterized as a spatial change relative to the reference position, and the relocated original data may be the original data relocated to the reference position according to the spatial change.

In some embodiments, the quality evaluation result may be determined according to the difference between the relocated original data and the reference data at the reference position. If the difference is relatively large or there is an abnormal situation (such as the disappearance of the line of response), the motion information or original data may be determined to be inaccurate, and a correction may be required. Otherwise, subsequent steps (such as generating the parametric image) may be performed directly.

The quality evaluation of motion information in the PET scanning process provided by the embodiments of the present disclosure may be an end-to-end process. The process does not require manual participation, which can ensure objectivity and consistency of the quality evaluation result, and significantly save the manpower and material costs. The quality evaluation efficiency can be improved.

In some embodiments, considering the diversity of the motion of the patient during the scan, the position information to be evaluated may be determined based on the motion of the patient, and then the quality evaluation result may be determined based on the position information to be evaluated. As shown in FIG. 11, step 1120 may include one or more of the following sub-steps.

In 1121, the position information to be evaluated at each time point of the plurality of time points may be determined by processing the line of response based on the motion information. In some embodiments, step 1121 may be performed by the position information obtaining module 225.

In some embodiments, the line of response may refer to each line of response in the list mode data obtained by the scanning device at the each time point. For more information about the line of response, please refer to relevant descriptions of the foregoing PET scanning principle. In some embodiments, processing the line of response may be referred to as relocating the line of response based on the motion information.

The position information to be evaluated may be referred to as position information of the target region in space after correction. For example, the position information to be evaluated may be characterized as position data such as a barycentric coordinate and/or a rotation scale of the target region at a sampling time point. The barycentric coordinate may refer to a coordinate of the center point of the target region in space. The rotation scale may refer to a rotation orientation of the target region in space.

In some embodiments, the target region may also be referred to as the region of interest. A specific characterization range of the target region may be determined according to actual needs. For example, the target region in process 1100 may be the target region in the aforementioned correction method (e.g., process 400). As another example, the target region in the process 1100 may also be a region determined according to the actual needs (a region that may characterize the patient motion situation, such as blood vessels, extremities, etc.).

In some embodiments, the position information to be evaluated of the target region (e.g., the region of interest) at the sampling time point may include the motion information of six degrees of freedom: degrees of freedom of movement and degrees of rotation in directions of three coordinate axes of X, Y, and Z (e.g., rotation angles around the coordinate axes of X, Y, and Z, respectively).

In some embodiments, the position information to be evaluated may be determined based on a difference between relevant information of processed line of response and the reference position. For example, the rotation scale may be determined according to an angle difference between a normal plane of the relocated line of response in space and a normal plane of the reference position, and the barycentric coordinate may be determined according to a displacement of the relocated line of response relative to the reference position, so as to determine the position information to be evaluated.

It should be noted that the present disclosure does not limit the reference position of the patient. For example, in some implementations, the position of the patient when the patient starts to be scanned (also may be understood as the position when the patient does not move) may be used as the reference position of the patient. In other embodiments, any position within the PET system may also be designated as the reference position of the patient.

In some embodiments, the processing of the line of response may also include further processing (such as back projection, sensitivity correction, etc.) on the relocated line of response to improve the accuracy of the position information to be evaluated. For more information of determining the position information to be evaluated, please refer to FIG. 14 and related descriptions thereof, which will be not repeated here.

In 1122, the quality evaluation result may be determined based on the position information to be evaluated at the each time point. In some embodiments, step 1122 may be performed by the evaluation result obtaining module 226.

As those skilled in the art may understand, when a preset sampling time period (such as greater than 20 minutes) is much longer than a preset sampling frequency (such as 1 s), a distribution of the position information to be evaluated may theoretically tend to be stable. And as time goes by, actual motion information of the patient may form a continuous broken line that approximates a straight line. That is, a distribution stability of the position information to be evaluated may indirectly reflect the similarity (which is a quantitative index) between the collected motion information of the patient and the actual motion information of the patient.

In some embodiments, the quality evaluation result may be determined according to the difference of the position information to be evaluated at adjacent time points. The evaluation index at each time point may be firstly determined based on the position information to be evaluated at the each time point. Then, one or more abnormal features may be determined based on a difference between the evaluation indexes at close time points. The one or more abnormal features may reflect the quality evaluation result.

The evaluation index may refer to feature data of the position information to be evaluated in space. In some embodiments, considering that the quality evaluation result may be characterized as a deviation between the distribution stability of the position information to be evaluated and the preset evaluation threshold under a determined quality evaluation dimension, the evaluation index of the position information to be evaluated may also be a relevant index of the distribution stability or deviation. For example, the relevant index may include a count of target regions at the each time point, the barycentric coordinate of each target region, and the rotation scale at the each time point.

The abnormal feature may refer to an evaluation result of a certain type of abnormal situation and may be used to describe the specific abnormal content of the abnormal situation. For example, for an abnormal situation where the motion information is inconsistent with the actual motion information, the abnormal feature may describe the difference between the motion information and the actual motion information at the each time point.

In some embodiments, the abnormal feature may be determined based on a preset quality evaluation index (e.g., evaluation dimension) by analyzing the evaluation index. For example, the difference in the barycentric coordinates at different time points may be analyzed to determine the abnormal feature.

In some embodiments, when the quality evaluation result of the motion information is generated, the distribution stability of the position information to be evaluated may be counted according to an occurrence order of the sampling time points first; and then the quality evaluation result of the motion information may be obtained according to the deviation between the distribution stability of the position information to be evaluated and the preset evaluation threshold.

In some embodiments, the specific content of the quality evaluation result may be determined according to actual needs. For example, the quality evaluation result may include various abnormal features of the deviation between the distribution stability of the position information to be evaluated and the preset evaluation threshold.

In some embodiments, the quality evaluation result may be determined based on the preset quality evaluation index. The preset quality evaluation index may refer to a quality evaluation dimension of motion information during the PET scanning process. The position information to be evaluated may be analyzed based on the preset evaluation index to determine the quality evaluation result. For example, the preset quality evaluation index may include the distribution stability of the position information to be evaluated. An analysis result of the position information to be evaluated may be obtained based on the evaluation dimension and used as the quality evaluation result. For more descriptions about the preset quality evaluation indexes, refer to FIG. 13 and related descriptions thereof, and will not be repeated here.

In order to further describe the quality evaluation result of the position information to be evaluated, the analysis process of the quality evaluation result may be described below in conjunction with FIG. 12.

In some embodiments, the six degrees of freedom, including the barycentric coordinates and the rotation angles of the region of interest in the X, Y, and Z directions, may be evaluated separately. In order to facilitate understanding and avoid redundant descriptions, the barycentric coordinates of the region of interest in the X, Y and Z directions are taken as an example. For the rotation angles of the region of interest in the X, Y and Z directions, please refer to the relevant descriptions of the barycentric coordinates of the region of interest in the X, Y and Z directions, which will not be repeated here.

Figure 12:
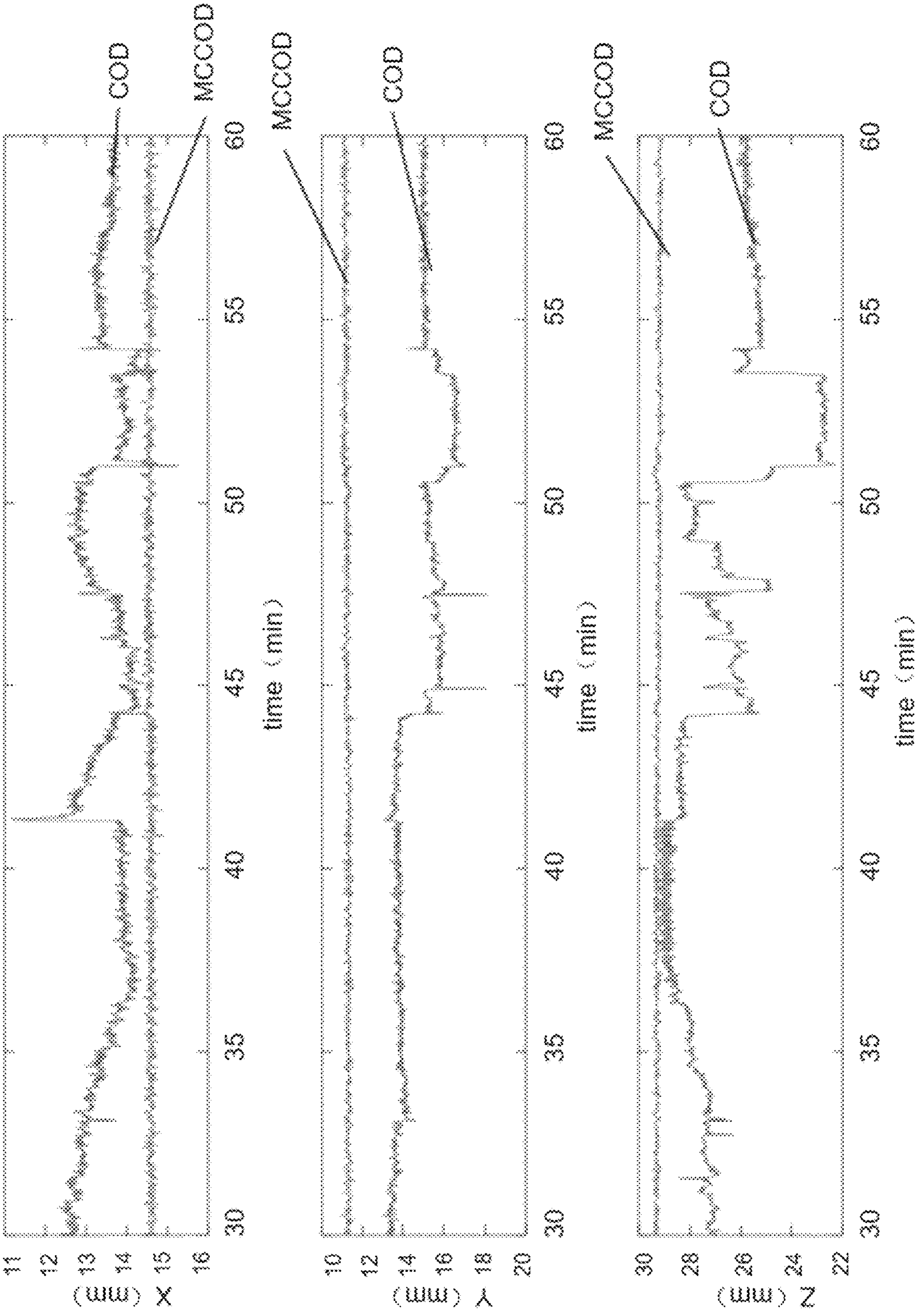
FIG. 12 is a schematic diagram illustrating a distribution of a barycentric coordinate of a region of interest in X, Y, and X directions changing over time according to some embodiments of the present disclosure.

Specifically, refer to FIG. 12, which schematically shows a schematic diagram of a specific example illustrating the centroid coordinates of the region of interest in the X, Y, and X directions changing over time. In FIG. 12, a centroid of distribution (COD) curve may be a barycentric coordinate curve of the region of interest collected during each time interval. A motion corrected centroid-of-distribution (MC-COD) curve may be a corresponding motion-corrected centroid coordinate curve. It may be seen from FIG. 12 that, in an X-axis direction, although the barycentric coordinates of the region of interest collected around the 41 st and 51 st minutes have a large displacement in the X-axis direction, the barycentric coordinates of the region of interest are relatively stable in the X-axis direction after motion correction (which is basically parallel to a time axis). Similarly, in a Y-axis direction, although faults occurred from the 44th minute to the 50th minute and the 54th minute, the barycentric coordinates of the region of interest are relatively stable in the Y-axis direction after motion correction (which is basically parallel to the time axis). In a Z-axis direction, although faults occurred from the 45th minute to the 50th minute and the 54th minute, and a large displacement occurred at the 48th minute, the barycentric coordinates of the region of interest are also relatively stable in the Z-axis direction after motion correction (which is basically parallel to the time axis). Therefore, in FIG. 12, the barycentric coordinates of the region of interest remain basically stable after the motion correction, which meets an expected standard.

It should be noted that those skilled in the art should be able to understand that FIG. 12 is only an exemplary illustration for better understanding of the present disclosure, rather than limiting the present disclosure. During a specific implementation, the distribution stability of the position information to be evaluated may be measured by quantitative indexes including but not limited to range, mean deviation, and standard deviation.

The quality evaluation of the motion information during the PET scan provided in the present disclosure may collect the list mode data and motion information of the region of interest according to the preset sampling frequency (such as 1 second) within the preset sampling time period (e.g., an entire PET scanning period, such as 40 minutes), which can evaluate the quality of the motion information continuously (during the entire preset sampling time period) and at a finer granularity (which is the same as the sampling frequency).

In some embodiments, a second quality evaluation result may also be determined based on the scanned images. The reliability of the quality evaluation result may be determined based on the quality evaluation result and the second quality evaluation result. The second quality evaluation result may be determined based on the scanned images, and a specific determination process may be similar to a processing process of original data.

In some embodiments, the reliability of the quality evaluation result may be determined according to a difference between the quality evaluation result and the second quality evaluation result. If there is no difference or a small difference between the quality evaluation result and the second quality evaluation result, the quality evaluation result may be reliable. If there is a large difference between the quality evaluation result and the second quality evaluation result, the quality evaluation result may be unreliable, and a manual review may be conducted.

Thus, the motion information may be evaluated based on two dimensions including the scanned images and the original data, thereby improving the reliability of the quality evaluation result.

Figure 13:
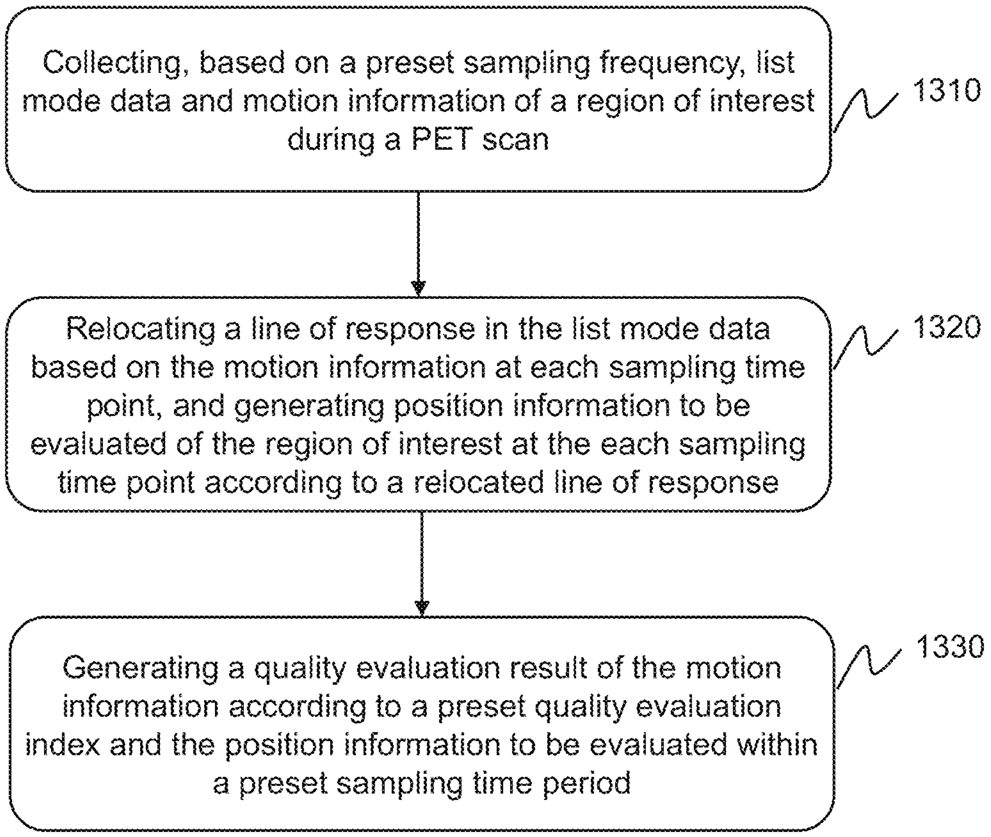
FIG. 13 is an integral flowchart illustrating a process for quality evaluation of motion information during a PET scan according to some embodiments of the present disclosure.

FIG. 13 is an integral flowchart illustrating a process for quality evaluation of motion information during a PET scan according to some embodiments of the present disclosure. As shown in FIG. 13, process 1300 may include one or more of the following steps. In some embodiments, one or more operations of the process 1300 shown in FIG. 13 may be implemented by the system for motion correction of the PET image shown in FIG. 1. For example, the process 1300 shown in FIG. 13 may be stored in the storage device 130 in the form of instructions, and called and/or executed by the processing device 120.

In 1310, the list mode data and motion information of the region of interest may be collected based on the preset sampling frequency during the PET scan. In some embodiments, step 1310 may be performed by the data collection module 211.

In some embodiments, the preset sampling frequency may be set according to actual needs. For example, if the motion information includes parameters used in the aforementioned calibration process (such as the process 400), the motion information may be represented by the imaging frequency during the correction process. The sampling frequency of the list mode data of the region of interest may be consistent with the imaging frequency during the correction process for the convenience of synchronous processing.

In some embodiments, the preset sampling frequency may be set independently. In some embodiments, the preset sampling time period may be the entire PET scan time period (usually 20 minutes to 40 minutes), and the sampling frequency may be once every 1 second. As those skilled in the art may understand, the embodiments of the present disclosure does not impose any restriction on the sampling frequency and the preset sampling time period. For example, the sampling frequency may be once every 0.5 seconds, once every 2 seconds, etc.

The list mode data may be the original data generated during the scanning process. For more descriptions about the list mode data, please refer to related descriptions of the above-mentioned PET imaging principle, which will not be repeated here.

In 1320, the line of response in the list mode data may be relocated using the motion information at each sampling time point, and the position information to be evaluated of the region of interest at the each sampling time point may be generated according to the relocated line of response. In some embodiments, step 1320 may be performed by the position information obtaining module 225.

Step 1320 may be similar to step 1121. For more descriptions of step 1320, refer to step 1121 above in the present disclosure, which will not be repeated here.

In 1330, the quality evaluation result of the motion information may be generated according to the preset quality evaluation index and the position information to be evaluated within the preset sampling time period. In some embodiments, step 1330 may be performed by the evaluation result obtaining module 226.

In some embodiments, the position information to be evaluated may be analyzed based on the evaluation dimension corresponding to the preset quality evaluation index to determine the quality evaluation result under the evaluation dimension.

In some embodiments, the preset quality evaluation index may be a displacement degree of the position information to be evaluated (see FIG. 12). For example, the evaluation result of the position to be evaluated whose distance from the reference position of the patient is less than the preset evaluation threshold may be considered to be that there is no displacement. The abnormal features (e.g., the evaluation result) of the position information to be evaluated whose distance from the patient reference position is larger or less than the preset evaluation threshold may include a displacement of the position information to be evaluated and the corresponding displacement value.

Those skilled in the art should be able to understand that the preset quality evaluation index may be related to a specific abnormal situation. The preset quality evaluation index may include but be not limited to abnormal situations such as displacements of motion information, which is not limited in the present disclosure.

It should be noted that those skilled in the art should be able to understand that there are various reasons why the position information to be evaluated does not meet the preset quality requirement. The preset quality evaluation index may be related to the specific abnormal situation. The preset quality evaluation index may include but be not limited to the abnormal situations such as the displacements of motion information, which is not limited in the present disclosure. When those skilled in the art need to migrate the relevant operations of the present disclosure to other situations in which the position information to be evaluated does not meet the preset quality requirement due to other reasons, the preset quality evaluation index may be corrected according to specific reasons.

The present disclosure mainly involves the following two reasons that cause the position information to be evaluated (which indirectly reflects that the correction of the motion information cannot meet the PET image reconstruction requirement) not meet the preset quality requirement: the first reason may be a fault situation, which may specifically refer that a motion marker used for locating the patient slipped during scanning, resulting in a displacement in the collected motion information (for example, the motion marker was put back to an original position after it was found), that is, the fault in the collected motion information, resulting in inconsistencies in the collected reference positions. The second reason may be the wobbling situation, which may be specifically referred to as a large-amplitude movement of the patient during scanning, which causes the collected motion information to be disturbed in a short time period (such as less than one minute), resulting in a large mutation in the collected motion information in the short time period.

In some embodiments, the preset quality evaluation index may include an evaluation dimension corresponding to the aforementioned abnormal situation. For the fault situation, the preset quality evaluation index may be characterized as the analysis of the distribution stability level of the position information to be evaluated, and the abnormal feature obtained based on the preset quality evaluation index may be recorded as a first preset index. For the wobbling situation, the preset quality evaluation index may be characterized as the analysis of the position information to be evaluated at a time continuity level (such as the displacement situation of the position information to be evaluated), and the abnormal feature obtained based on the preset evaluation index may be recorded as a second preset index.

It should be noted that those skilled in the art should be able to understand that the present disclosure does not limit specific values of the first preset index and the second preset index. Taking the first preset index as an example, by performing mathematical statistics on the position information to be evaluated according to the order of sampling time points, whether the position information to be evaluated has a segmented distribution within the preset sampling time period may be judged according to the specific value of the first preset index. Similarly, for the second preset index, by performing mathematical statistics on the position information to be evaluated according to the order of sampling time points, whether the position information to be evaluated has a wobbling value within the preset sampling time period may be judged according to the specific value of the second preset index.

The quality evaluation result provided in the present disclosure may be obtained based on the preset quality evaluation index and the position information to be evaluated within the preset sampling time period, which not only has high reliability but also does not require manual participation in the whole process, thereby ensuring the objectivity and consistency of the quality evaluation result, significantly saving manpower and material costs, and providing high-quality evaluation efficiency.

It should be noted that the method for quality evaluation of the motion information during the PET scan provided in this embodiment has wide applicability. Specifically, the method for quality evaluation of the motion information during the PET scan provided by the present disclosure does not impose any limitation on the system for PET imaging firstly. The system for PET imaging may be an emission computed tomography (ECT) device, a positron emission tomography (PET) device, a single photon emission computed tomography (SPECT) device, a multimodal device, or the like, or any combination thereof. An exemplary multimodal device may include a CT-System for PET imaging, an MR-System for PET imaging, or the like. Secondly, the method for quality evaluation of the motion information during the PET scan provided by the present disclosure does not impose any limitations on the drug/tracer. For example, in some embodiments, the drug/tracer may include one or more radioactive elements, such as carbon (11C), nitrogen (13N), oxygen (15O), and fluorine (18F). In some embodiments, when the system for PET imaging uses a SPECT scanning system, the tracer used may be one or more of technetium-99m, iodine-123, indium-111, and iodine-131. Exemplarily, the tracer may be a single tracer such as 18F-FDG, 18F-EF5, 8F-ML-10. The tracer may also be a multi-tracer for dynamic scanning, such as 18F-FDG and 18F-FLT, 11 C-ACT, 18F-FDG, and other dual tracers.

Figure 14:
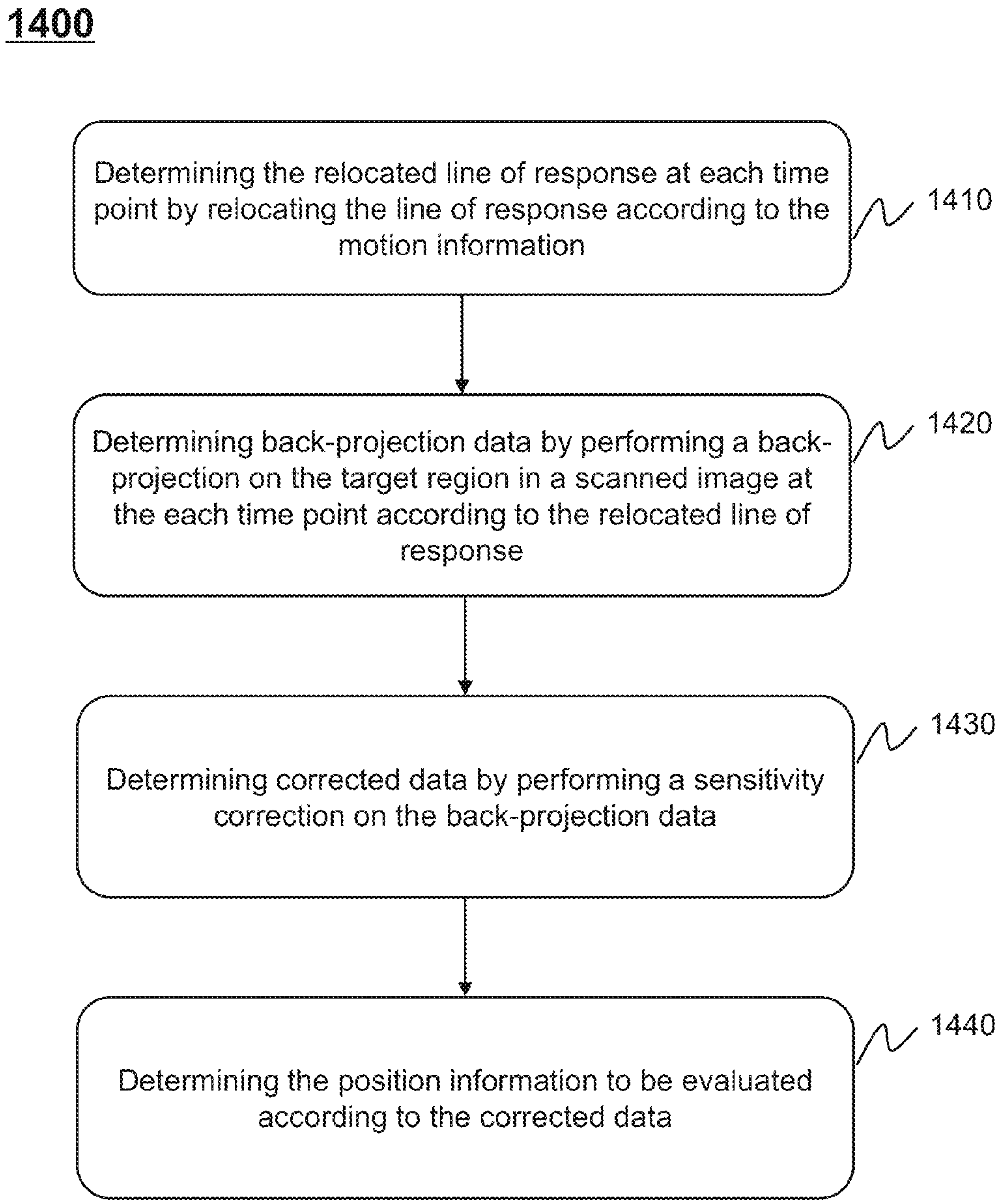
FIG. 14 is a flowchart illustrating an exemplary process for determining position information to be evaluated according to some embodiments of the present disclosure.

FIG. 14 is a flowchart illustrating an exemplary process for determining position information to be evaluated according to some embodiments of the present disclosure. As shown in FIG. 14, process 1400 may include one or more of the following steps. In some embodiments, one or more operations of the process 1400 shown in FIG. 14 may be implemented by the system for motion correction of the PET image shown in FIG. 1. For example, the process 1400 shown in FIG. 14 may be stored in the storage device 130 in the form of instructions, and called and/or executed by the processing device 120.

In 1410, the relocated line of response at each time point may be determined by relocating the line of response according to the motion information. In some embodiments, step 1410 may be performed by the position information obtaining module 225.

In some embodiments, the relocated line of response may refer to a line of response that has been spatially moved based on the motion information. For example, the motion information may include a motion parameter relative to the reference position, and the line of response may be spatially moved based on the motion parameter (for example, generating a spatial variation matrix), to determine the relocated line of response. At this time, the line of response may be relocated to the reference position.

In 1420, back-projection data may be determined by performing a back-projection on the target region in a scanned image at the each time point according to the relocated line of response. In some embodiments, step 1420 may be performed by the position information obtaining module 225.

The back projection may refer to projecting the line of response in the original data in space according to a preset algorithm. Considering that the line of response is a projection result obtained by scanning a radioactive source, the process of restoring the line of response to the scanning space may be recorded as the back projection. The back-projection data (or data points) may refer to data points in space after back-projecting the line of response in the target region.

In 1430, corrected data points may be determined by performing a sensitivity correction on the back-projection data points. In some embodiments, step 1430 may be performed by the position information obtaining module 225.

The sensitivity may refer to a sum of a count of coincidence events detected by the PET system per unit time and unit activity (detected by the detector under the situation of unit radiation dose in unit volume). If the line of response is relocated, the sensitivity may change and may need to be recalculated for correction.

In some embodiments, considering the difference between the imaging angle of the scanning device after correction at the current time point and the imaging angle of the initial position, the sensitivity correction may also include rotating the back-projected data points in space to determine the difference in imaging angle, thereby determining the rotation scale.

In 1440, the position information to be evaluated may be determined according to the corrected data points. In some embodiments, step 1440 may be performed by the position information obtaining module 225.

In some embodiments, data points contained in the target region may be determined from the corrected data points, and the position information to be evaluated may be determined according to the distribution of the data points in space. For example, the coordinate of a center point among the data points included in the target region may be determined as the barycentric coordinate in the position information to be evaluated. The normal plane formed by the data points included in the target region may be used to determine the rotation scale in the position information to be evaluated.

In some embodiments, the position information to be evaluated may include a first index. The first index may be related to a density distribution of the corrected data points. For example, the first index may be a distribution of data points contained in the target region at each time point.

In some embodiments, the density distribution of the corrected data points may be related to the barycentric coordinate of the target region at each time point, and the corresponding first index may be related to the barycentric coordinate of the target region at the each time point. For example, the first index may include a fluctuation of the barycentric coordinate at the each time point, and further characterize the distribution stability of the barycentric coordinate of the location to be evaluated at the each time point.

In some embodiments, the position information to be evaluated may further include a second index. The second index may be an angle change of the target region relative to the initial position at the each time point. Thus, the second index may represent the change of the rotation scale of the position to be evaluated relative to the initial position. The distribution stability of the rotation scale at the each time point may be obtained by analyzing the second index at the each time point.

In some embodiments, the initial position may be determined based on a reference frame in the scanned images, that is, the initial position may be a position when the reference frame is generated. For example, the reference frame may refer to a first frame of the scanned images when the imaging is performed, and the corresponding initial position may be the initial position of the patient when the scan is started. As another example, the initial position may be the reference position of the aforementioned related process (e.g., process 1100).

Therefore, the quality evaluation of the motion information in the PET scanning process may include performing the back-projection on the relocated line of response in the region of interest and then performing the sensitivity correction on the back-projected points obtained by the back-projection. By performing a simplified back-projection on all the lines of response at each sampling time point within the preset sampling time period, the barycentric coordinate and/or rotation scale of the region of interest at the sampling time point can be obtained more quickly, thereby improving the quality evaluation efficiency. Further, through the sensitivity correction, the calculation accuracy of the barycentric coordinate and/or the rotation scale of the region of interest at the sampling time point can be improved.

In some embodiments, the barycentric coordinate in the information to be evaluated may be determined based on a point cloud image. That is, the point cloud image of the back-projection points at the sampling time point may be generated based on all the back-projection points after the sensitivity correction. Then, the barycentric coordinate of the region of interest may be calculated according to the point cloud image.

It should be noted that if the motion of the organ tissue (such as the head) to be scanned in the region of interest is a rigid motion, values of the barycentric coordinates of the region of interest in the X, Y, Z directions may be average values of coordinate values of the organ tissue to be scanned in the X, Y, and Z directions. If the motion of the organ tissue (such as blood) to be scanned in the region of interest is a flexible motion, the barycentric coordinates obtained based on an outline of the organ tissue to be scanned obtained from the point cloud image may be designated as the barycentric coordinates of the region of interest.

Therefore, the quality evaluation of the motion information in the PET scanning process may include performing the simplified back-projection on all the lines of response within the preset sampling time period to generate the position information to be evaluated (including but not limited to the barycentric coordinate and the rotation scale of the region of interest), which has a high generation efficiency. Further, the quality evaluation result may be obtained according to the preset quality evaluation index and the position information to be evaluated within the preset sampling time period, which can not only have high reliability but also require no manual participation in the whole process and lay a good foundation for the objectivity and consistency of the quality evaluation result.

In some embodiments, the rotation scale of the position information to be evaluated may be determined according to a moment of inertia matrix of the corrected data points in space. Taking the rotation angle positions around the three coordinate axes of X, Y, and Z as an example, when the rotation scale is determined, a second-order moment of inertia matrix may be obtained by calculating according to a three-dimensional position coordinate of each of the back-projection points at the each sampling time point and a sensitivity correction value corresponding to the each of the back-projection points. Then a rotation matrix may be obtained by calculating according to the second-order moment of inertia matrix. The rotation scale of the region of interest may be obtained by converting the rotation matrix into Euler angles in three directions of X, Y and Z.

Specifically, at the sampling time point t, the second-order moment of inertia matrix of the i-th projection point may be calculated by the following equation:

$$I_t = \begin{bmatrix} I_{xx} & I_{xy} & I_{xz} \\ I_{yx} & I_{yy} & I_{yz} \\ I_{zx} & I_{zy} & I_{zz} \end{bmatrix},$$

where $$I_{xx} = \frac{1}{\sum_i s_i} \sum_i s_i\left(y_i^2 + z_i^2\right),\ I_{xy} = I_{yx} = \frac{1}{\sum_i s_i} s_i x_i y_i,$$

$$I_{yy} = \frac{1}{\sum_i s_i} \sum_i s_i\left(x_i^2 + z_i^2\right),\ I_{xz} = I_{zx} = \frac{1}{\sum_i s_i} \sum_i s_i x_i z_i, \text{ and}$$

$$I_{zz} = \frac{1}{\sum_i s_i} \sum_i s_i\left(x_i^2 + y_i^2\right),\ I_{yz} = I_{zy} = \frac{1}{\sum_i s_i} \sum_i s_i y_i z_i.$$

$x_i$, $y_i$, $z_i$ denote the coordinate values of the barycentric coordinate of the i-th projection point in the X, Y, and Z directions, respectively, and si denotes the sensitivity correction value corresponding to the i-th projection point. As those skilled in the art may understand, the sensitivity correction value may be a predetermined value and may be determined by the system for PET imaging.

More specifically, the calculating the rotation matrix according to the second-order moment of inertia matrix may include obtaining the rotation matrix R through a singular value decomposition: $I_t = R^T I R$, where I denotes a third-order identity matrix and t denotes the sampling time point.

Therefore, the quality evaluation of the motion information in the PET scanning process may include performing the back-projection on the relocated line of response in the region of interest and then performing the sensitivity correction on the back-projected points obtained by the back-projection. By performing a simplified back-projection on all the lines of response at each sampling time point within the preset sampling time period, the barycentric coordinate and/or rotation scale of the region of interest at the sampling time point can be obtained more quickly, thereby improving the quality evaluation efficiency. Further, through the sensitivity correction, the calculation accuracy of the barycentric coordinate and/or the rotation scale of the region of interest at the sampling time point can be improved.

In some embodiments, whether the motion information affects subsequent steps (such as generating the parametric image) may be determined according to the quality evaluation result and the preset quality requirement. If the quality evaluation result does not meet the preset quality requirement, the motion information and/or original data may need to be corrected. If the quality evaluation result meets the preset quality requirement, subsequent steps may be performed directly based on the corrected original data (or the scanned images).

Figure 15:
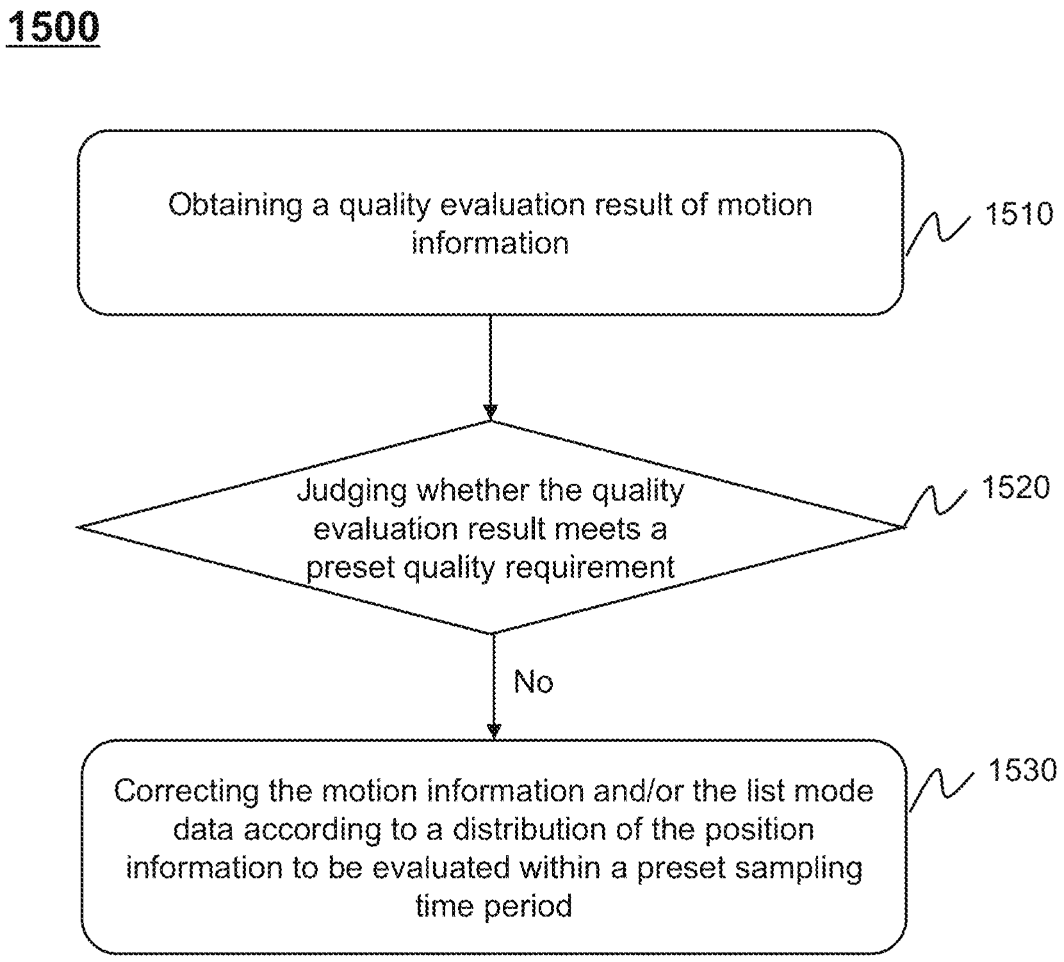
FIG. 15 is a flowchart illustrating an exemplary process for correcting the motion information according to some embodiments of the present disclosure.

FIG. 15 is a flowchart illustrating an exemplary process for correcting the motion information according to some embodiments of the present disclosure. As shown in FIG. 15, process 1500 may include one or more of the following steps. In some embodiments, one or more operations of the process 1500 shown in FIG. 15 may be implemented by the system for motion correction of the PET image shown in FIG. 1. For example, the process 1500 shown in FIG. 15 may be stored in the storage device 130 in the form of instructions, and called and/or executed by the processing device 120.

In 1510, the quality evaluation result of the motion information may be obtained. In some embodiments, step 1510 may be performed by the evaluation result obtaining module 226.

For the relevant descriptions about obtaining the quality evaluation result, refer to FIGS. 11 and 13, which will not be repeated here.

In 1520, whether the quality evaluation result meets the preset quality requirement may be judged. In some embodiments, step 1520 may be performed by the correction module 222.

The preset quality requirement may be related to the requirements for scanned images in subsequent steps. For example, when the subsequent step is to generate a 3D model, the preset quality requirement may include there being no wobbling situation.

In some embodiments, the preset quality requirement may represent a numerical requirement for the specific abnormal feature in the quality evaluation result. For example, the preset quality requirement may include a displacement threshold value. If the displacement value exceeds the displacement threshold value at a certain time point, which means that the abnormal feature may not meet the preset quality requirement, then the motion information may need to be corrected.

As those skilled in the art may understand, when the quality evaluation result meets the preset quality requirement (i.e., the judgment result in step 1520 is yes), there may be no need to correct the motion information, and subsequent processing may be performed directly. For example, the imaging device of the system for PET imaging may directly reconstruct the PET images (such as 3D medical images) according to the list mode data and the motion information.

In 1530, if the quality evaluation result does not meet the preset quality requirement, the motion information and/or the list mode data may be corrected according to the distribution of the position information to be evaluated within the preset sampling time period.

In some embodiments, when the motion information and/or the list mode data is corrected, a correction scheme may be determined according to the specific abnormal feature of the preset quality requirement that the quality evaluation result does not meet. For example, if the abnormal feature representing the difference between the motion information and the actual motion information in the quality evaluation result does not meet the corresponding preset quality requirement, it may be known that the motion information is wrong according to the abnormal feature. The corresponding correction scheme may be to correct the motion information according to the difference between the motion information and the actual motion information.

In some embodiments, in order to eliminate the impact of inaccurate motion information on the subsequent steps (such as generating the parametric image), the updated motion information may be used as a correction basis for the scanned images to re-correct the scanned images after the motion information is corrected. That is, the motion information may be updated first based on the quality evaluation result; then the corrected scanned images may be determined based on the updated motion information.

The quality control of motion information in the PET scanning process may include correcting the motion information and/or list mode data that does not meet the preset quality requirement so that the corrected motion information and/or list mode data can be used to reconstruct the PET image of the region of interest, which can realize the intelligent reconstruction of the PET image while ensuring the quality of the reconstructed PET image and realizing an end-to-end process, thereby saving the manpower and material costs.

For the wobbling situation and fault situation, the present disclosure may also provide corresponding corrections as follows.

In some embodiments, for the fault situation, the preset quality requirement may be a numerical requirement (such as a variance threshold, etc.) of the first preset index. If the first preset index meets the preset quality requirement, which may indicate that the distribution stability of the position information to be evaluated meets the requirement, and no fault occurs in the original data. On the contrary, it may indicate that a fault occurs.

In some embodiments, if it is determined that a fault occurs in the distribution of the position information to be evaluated within the preset sampling time period, the original data may be reconstructed hierarchically based on a specific time point when the first preset index in the quality evaluation result does not meet the preset quality evaluation index, then the original data may be re-spliced based on a hierarchical reconstruction result, and the motion information may be updated.

In some embodiments, one or more of the following steps may be used to correct the motion information.

Firstly, each of first sampling time points where the fault occurs in the position information to be evaluated within the preset sampling time period may be obtained; and the motion information may be divided into several segments of motion information according to the first sampling time points.

Then, the reference PET image may be obtained by performing a PET image reconstruction without an attenuation correction respectively on list mode data collected corresponding to each of the several segments of motion information. In some embodiments, the reference frame may refer to a first frame of the reference PET image.

Then, registration information corresponding to the reference PET image of each frame except a first frame may be obtained by registering the reference PET image of the each frame except the first frame to the reference PET image of the first frame, respectively.

Finally, the corrected motion information may be obtained by correcting the motion information according to the registration information, or by incorporating the registration information into the motion information as an additional correction.

Therefore, the quality control of the motion information during the PET scan may include dividing the motion information into the several segments of motion information according to each of first sampling time points where the fault occurs in the position information to be evaluated, registering the reference PET image, and correcting the patient information according to the registration information, thereby making the corrected motion information more in line with the actual motion information of the patient and lay a foundation for reconstructing to obtain high-quality PET images.

In some embodiments, for wobbling situation, the preset quality requirement may be characterized as a numerical requirement (such as a displacement value threshold) for the second preset index. If the second preset index meets the preset quality evaluation index, which may indicate that the spatial-temporal continuity of the position information to be evaluated meets the requirement, and there is no wobbling occur in the original data. On the contrary, it may indicate that a wobbling occurs.

In some embodiments, if it is determined that the distribution of the position information to be evaluated has the wobbling situation within the preset sampling time period, wobbling points in the original data may be determined based on a specific time point when the second preset index in the quality evaluation result does not meet the preset quality evaluation index, and data corresponding to the wobbling points may be removed to perform a complete PET image reconstruction again.

In some embodiments, the list mode data may be corrected or amended by one or more of the following steps.

Firstly, each of second sampling time points of the wobbling position information to be evaluated may be obtained according to the second preset index.

Then, corrected list mode data may be obtained by removing the list mode data collected at all the second sampling time points.

Therefore, the quality control of the motion information in the PET scanning process may include correcting the list mode data by removing the list mode data corresponding to the second sampling time points corresponding to the wobbling position information to be evaluated, which can make the corrected list mode data more reliable by removing the mode data collected in the case of interference and lay a solid foundation for reconstructing to obtain the high-quality PET images.

Further, those skilled in the art should be able to understand that, in practical applications, when the position information to be evaluated does not meet the preset quality requirement, the present disclosure does not limit the order of the above two correction methods, and the above two correction methods are not mutually exclusive. For example, for the corrected list mode data (removal of wobbling points), there may still be faults in the distribution of the position information to be evaluated within the preset sampling time period. At this time, the motion information may continue to be corrected (e.g., based on the registration information, by performing the segment correction).

The quality control of the motion information during the PET scan may include correcting the motion information and/or list mode data that do not meet the preset quality requirement to reconstruct the PET image of the region of interest, which can ensure the quality of reconstructed PET images and realize the end-to-end process while intelligently reconstructing the PET images, thereby saving the manpower and material costs.

Figure 16:
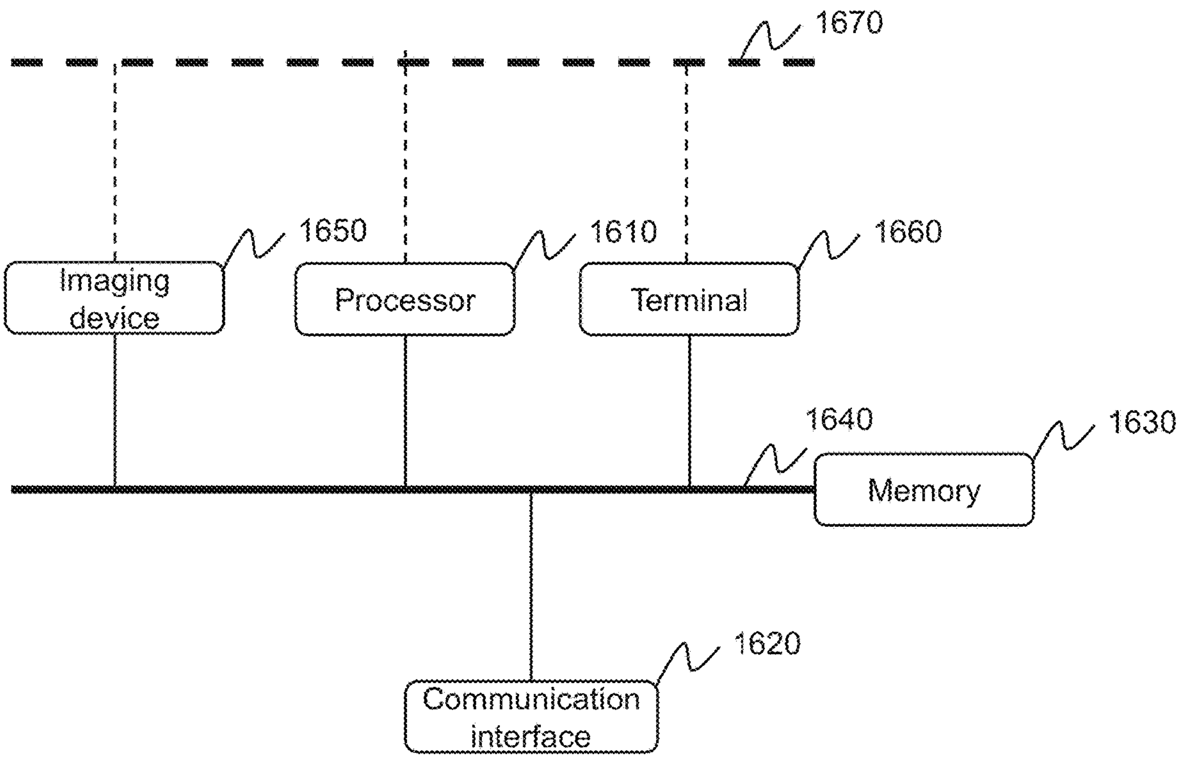
FIG. 16 is a diagram of a system for PET imaging according to some embodiments of the present disclosure.

The embodiment of the present disclosure may provide a system for PET imaging (see FIG. 16). FIG. 16 is a diagram of a system for PET imaging according to some embodiments of the present disclosure.

As shown in FIG. 16, the system for PET imaging may include a processor 1610 and a memory 1630, and a computer program may be stored in the memory 1630. When executed by the processor 1610, the computer program may implement the method for quality evaluation of the motion information during the PET scan described in any one above to evaluate the motion information and/or the method for quality control of the motion information during the PET scan described in any one above to correct the motion information and/or list mode data.

As shown in FIG. 16, the system for PET imaging may further include an imaging device 1650, a terminal 1660, a network 1670, a communication interface 1620, and a communication bus 1640. The components of the system for PET imaging may be connected in one or more ways. For example, the imaging device 1650 may be directly connected to the processor 1610 through the communication bus 1640 or through the network 1670. As another example, the terminal 1660 may be directly connected to the processor 1610 through the communication bus 1640 or connected through the network 1670. The processor 1610, the communication interface 1620, and the memory 1630 may communicate with each other through a communication bus 1640.

In some embodiments, the imaging device 1650 may scan the patient and obtain data related to the patient. In some embodiments, the imaging device 1650 may be an emission computed tomography (ECT) device, a positron emission tomography (PET) device, a single photon emission computed tomography (SPECT) device, a multimodality device, or the like, or any combination thereof. Exemplary multimodal devices may include a PET-CT imaging system, a PET-MR imaging system, or the like. In some embodiments, a multimodality imaging device 1650 may include modules and/or components for performing PET imaging and/or correlation analysis. In other embodiments, the imaging device 1650 may be a PET imaging system.

The terminal 1660 may be connected to and/or communicate with the imaging device 1650, the processor 1610, and/or the memory 1630. In some embodiments, the terminal 1660 may include, but not limited to, a mobile device, a tablet computer, a laptop computer, or the like, or any combination thereof. In some embodiments, the terminal 1660 may also include an input device, an output device, or the like. The input device may include a keyboard, a touch screen (e.g., with tactile or tactile feedback), a voice input, an eye tracking input, a brain monitoring system, or devices with any other similar input mechanism capable of receiving character and/or numeric input. Other types of input devices may include cursor control devices, such as a mouse, a trackball, or a cursor direction key. The output device may include a display, a printer, or the like, or any combination thereof.

The network 1670 may include any suitable network 1670 that may facilitate the exchange of information and/or data in the system for PET imaging. The network 1670 may include but not limited to wired or wireless connection methods, such as Bluetooth, infrared, near field communication (NFC), local region network, wide region network, etc. The network 1670 is represented only by a thick dashed line in the figure.

The communication bus 1640 may be a Peripheral Component Interconnect (PCI) bus, an Extended Industry Standard Architecture (Extended Industry Standard Architecture, EISA) bus, or the like. The communication bus 1640 may be divided into address bus, data bus, control bus, etc. For ease of representation, the communication bus 1640 is represented only by a thick line in the figure, but it does not mean that there is only one bus or one type of bus. The communication interface 1620 may be used for communication between the PET data processing device and other devices.

The processor 1610 may process data and/or information obtained from the imaging device 1650, the memory 1630, and/or the terminal 1660. In addition, the processor 1610 may also be a control center of the system for PET imaging, using various interfaces and lines to connect various parts of the entire system for PET imaging.

In addition, the processor 1610 may be a central processing unit (CPU) or any other general-purpose processor 1610, digital signal processor 1610 (DSP), application specific integrated circuits (ASIC), field-programmable gate array (FPGA), or any other programmable logic device, discrete gate or transistor logic device, discrete hardware component, etc. The general-purpose processor 1610 may be a microprocessor 1610. The processor 1610 may also be any conventional processor 1610, etc.

Additionally, the memory 1630 may also be used to store data and/or any other information. In some embodiments, the memory 1630 may store data obtained from the imaging device 1650, the processor 1610, and/or the terminal 1660. The data may include image data obtained by the processor 1610, algorithms and/or models for processing the image data, or the like.

The memory 1630 may include a non-volatile and/or volatile memory. The nonvolatile memory may include a read only memory (ROM), a programmable read only memory (PROM), an electrically programmable ROM (EPROM), an electrically erasable programmable ROM (EEPROM), or a flash memory. The volatile memory may include a random access memory (RAM) or an external cache memory. By way of illustration and not limitation, the RAM may be available in many forms, such as a static RAM (SRAM), a dynamic RAM (DRAM), a synchronous DRAM (SDRAM), a double data rate SDRAM (DDRSDRAM), an enhanced SDRAM (ESDRAM), a synchlink DRAM (SLDRAM), a memory bus (Rambus), a direct RAM (RDRAM), a direct bus dynamic RAM (DRDRAM) of the memory 1630, a bus dynamic RAM (RDRAM) of the memory 1630, etc.

The quality evaluation and control of the motion information during the PET scan, the PET data processing device and the system for PET imaging in the present disclosure may have one or more of the following advantages.

The quality evaluation of the motion information during the PET scan may include collecting the list mode data and motion information of the region of interest according to the preset sampling frequency (such as 1 second) within the preset sampling time period (e.g., an entire PET scanning period, such as 40 minutes), which can evaluate the quality of the motion information continuously (during the entire preset sampling time period) and at a finer granularity (which is the same as the sampling frequency). The position information to be evaluated (including but not limited to the barycentric coordinate and the rotation scale of the region of interest) may be generated by performing the simplified back-projection on all the lines of response within the preset sampling time period, which has a high generation efficiency. Further, the quality evaluation result may be obtained according to the preset quality evaluation index and all the position information to be evaluated within the preset sampling time period, which not only has high reliability but also requires no manual participation in the whole process, which can ensure the objectivity and consistency of the quality evaluation result, significantly save manpower and material costs, and have high-quality evaluation efficiency.

Further, the quality control of the motion information during the PET scan may include using the above-mentioned operations for quality evaluation firstly to obtain the quality evaluation result of the motion information. If the quality evaluation result does not meet the preset quality requirement, the motion information and/or list mode data may be corrected according to the distribution of the position information to be evaluated within the preset sampling time period. Therefore, the quality control of the motion information in the PET scanning process may include correcting the motion information/list mode data that does not meet the preset quality requirement to reconstruct the PET image of the region of interest, which can ensure the quality of the reconstructed PET image and implement the end-to-end process while implementing the PET image intelligence reconstruction, thereby saving the manpower and material costs.

Since the PET data processing device and the system for PET imaging provided by the present disclosure belong to the same inventive concept as the method for quality evaluation and/or quality control of the motion information in the PET scanning process provided by the present disclosure, therefore, the PET data processing device and the system for PET imaging may at least have the same beneficial effect(s), which will not be repeated here.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures, or characteristics may be combined as suitable in one or more embodiments of the present disclosure.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

In some embodiments, numbers describing the number of ingredients and attributes are used. It should be understood that such numbers used for the description of the embodiments use the modifier “about”, “approximately”, or “substantially” in some examples. Unless otherwise stated, “about”, “approximately”, or “substantially” indicates that the number is allowed to vary by ±20%. Correspondingly, in some embodiments, the numerical parameters used in the description and claims are approximate values, and the approximate values may be changed according to the required characteristics of individual embodiments. In some embodiments, the numerical parameters should consider the prescribed effective digits and adopt the method of general digit retention. Although the numerical ranges and parameters used to confirm the breadth of the range in some embodiments of the present disclosure are approximate values, in specific embodiments, settings of such numerical values are as accurate as possible within a feasible range.

For each patent, patent application, patent application publication, or other materials cited in the present disclosure, such as articles, books, specifications, publications, documents, or the like, the entire contents of which are hereby incorporated into the present disclosure as a reference. The application history documents that are inconsistent or conflict with the content of the present disclosure are excluded, and the documents that restrict the broadest scope of the claims of the present disclosure (currently or later attached to the present disclosure) are also excluded. It should be noted that if there is any inconsistency or conflict between the description, definition, and/or use of terms in the auxiliary materials of the present disclosure and the content of the present disclosure, the description, definition, and/or use of terms in the present disclosure is subject to the present disclosure.

Finally, it should be understood that the embodiments described in the present disclosure are only used to illustrate the principles of the embodiments of the present disclosure. Other variations may also fall within the scope of the present disclosure. Therefore, as an example and not a limitation, alternative configurations of the embodiments of the present disclosure may be regarded as consistent with the teaching of the present disclosure. Accordingly, the embodiments of the present disclosure are not limited to the embodiments introduced and described in the present disclosure explicitly.

What is claimed is:

1. A method implemented on at least one machine each of which has at least one processor and at least one storage device for motion correction of a positron emission computed tomography (PET) scanned image, comprising:

obtaining scanned images of a scanned object generated at a plurality of time points;

obtaining motion information of the scanned object at the plurality of time points:

determining a quality evaluation result by performing a quality evaluation on the motion information, including:

determining position information to be evaluated at each time point of the plurality of time points by processing, based on the motion information, a line of response of the scanned object; and determining the quality evaluation result based on the position information to be evaluated at the each time point, wherein the quality evaluation result refers to an evaluation of whether there is an abnormality in the motion information that is used to correct the scanned images; and determining a parametric image by performing, based on the motion information and the quality evaluation result, a correction processing on the scanned images, wherein the correction processing is configured to correct an influence of a motion of the scanned object on the scanned images.

2. The method of claim 1, wherein the determining a parametric image by performing a correction processing on the scanned images includes:

determining an initial time-activity curve of at least one voxel of the scanned images based on the scanned images;

determining a corrected time-activity curve based on the scanned images or the initial time-activity curve using a correction algorithm or a machine learning model, wherein the machine learning model refers to a processing model that performs the motion correction on the initial time-activity curve to output the corrected time-activity curve after the motion correction; and determining the parametric image based on the corrected time-activity curve.

3. The method of claim 2, wherein the determining a corrected time-activity curve based on the scanned images or the initial time-activity curve includes:

determining a target region based on a target voxel of the scanned images, wherein the target voxel is a unit in a three-dimensional (3D) image that needs to be corrected; and determining, based on the scanned images or the initial time-activity curve of the at least one voxel in the target region, the corrected time-activity curve of the target voxel using the machine learning model.

4. The method of claim 3, wherein the target region includes the target voxel at a central position of the target region and adjacent voxels of the target voxel.

5. The method of claim 3, wherein a size of the target region is determined based on a motion amplitude of the scanned object and the size of the target region is positively correlated with the motion amplitude.

6. The method of claim 1, wherein the determining a parametric image by performing a correction processing on the scanned images includes:

determining an initial time-activity curve of at least one voxel of the scanned images based on the scanned images; and determining the parametric image by inputting an input function and the initial time-activity curve into a machine learning model.

7. The method of claim 6, wherein the determining the parametric image by inputting an input function and the initial time-activity curve into a machine learning model includes:

determining kinetic parameters by inputting the input function and the initial time-activity curve into the machine learning model; and determining the parametric image based on the kinetic parameters.

8. The method of claim 6, wherein the determining the parametric image by inputting an input function and the initial time-activity curve into a machine learning model includes:

determining a target region based on a target voxel of the scanned images; and determining, based on the input function and the initial time-activity curve of the at least one voxel in the target region, kinetic parameters and/or the parametric image of the target voxel using the machine learning model.

9. The method of claim 1, wherein the determining position information to be evaluated at each time point of the plurality of time points includes:

relocating the line of response based on the motion information at the each time point to obtain a relocated line of response; and generating the position information to be evaluated according to the relocated line of response.

10. The method of claim 9, wherein the generating the position information to be evaluated according to the relocated line of response includes:

determining back-projection data by performing, according to the relocated line of response, a back-projection on the target region in one of the scanned images at the each time point;

determining corrected data by performing a sensitivity correction on the back-projection data; and determining the position information to be evaluated according to the corrected data.

11. The method of claim 9, wherein the position information to be evaluated includes a second index, the second index being an angle change of the target region at the each time point relative to an initial position, the initial position being determined based on a reference frame of the scanned images.

12. The method of claim 1, wherein the determining the quality evaluation result based on the position information to be evaluated at the each time point includes:

determining an evaluation index at the each time point based on the position information to be evaluated at the each time point; and determining one or more abnormal features based on a difference between the evaluation indexes at adjacent time points, wherein the one or more abnormal features reflect the quality evaluation result.

13. The method of claim 1, wherein the evaluation of whether there is an abnormality in the motion information includes whether there is a fault situation which refers to a motion marker used for locating a patient slipping during a scanning, resulting in a displacement in collected motion information, and the method further includes:

if the fault situation occurs in a distribution of the position information to be evaluated within a preset sampling time period, reconstructing original data hierarchically based on a specific time point when a first preset index in the quality evaluation result does not meet a preset quality evaluation index, then re-splicing the original data based on a hierarchical reconstruction result, and updating the motion information.

14. The method of claim 1, wherein the evaluation of whether there is an abnormality in the motion information includes whether there is a wobbling situation which is referred to as a large-amplitude movement of a patient during a scanning, and the method further includes:

if the wobbling situation occurs within a preset sampling time period, determining wobbling points in the original data based on a specific time point when a second preset index in the quality evaluation result does not meet a preset quality evaluation index, and removing data corresponding to the wobbling points to perform a complete PET image reconstruction again.

15. A method implemented on at least one machine each of which has at least one processor and at least one storage device for quality evaluation of motion information during a positron emission computed tomography (PET) scan, comprising:

collecting, based on a preset sampling frequency, list mode data and motion information of a region of interest (ROI) of a scanned object during the PET scan;

relocating a line of response in the list mode data based on the motion information at each sampling time point to obtain a relocated line of response;

generating position information to be evaluated of the ROI at the each sampling time point according to the relocated line of response; and generating a quality evaluation result of the motion information according to a preset quality evaluation index and the position information to be evaluated within a preset sampling time period, wherein the quality evaluation result refers to an evaluation of whether there is an abnormality in the motion information that is used to correct scanned images of the ROI obtained during the PET scan.

16. The method of claim 15, wherein the position information to be evaluated includes a barycentric coordinate and/or a rotation scale of the ROI; and before obtaining the barycentric coordinate and/or the rotation scale of the ROI, the method further includes:

performing, in the ROI, a back-projection on each relocated line of response at the each sampling time point to obtain back-projection points;

performing a sensitivity correction on each of the back-projection points to obtain corrected back-projection points; and obtaining the barycentric coordinate and/or the rotation scale of the ROI at the each sampling time point according to the corrected back-projection points.

17. The method of claim 16, wherein the generating a quality evaluation result of the motion information according to a preset quality evaluation index and the position information to be evaluated within a preset sampling time period includes:

determining a distribution stability of the position information to be evaluated according to an occurrence order of a plurality of sampling time points; and determining the quality evaluation result of the motion information according to a deviation between the distribution stability of the position information to be evaluated and a preset evaluation threshold.

* * * * *